US012695361B2

(12) United States Patent
Yoshimi

(10) Patent No.: US 12,695,361 B2
(45) Date of Patent: Jul. 28, 2026

(54) METHOD FOR MANUFACTURING DRIVE DEVICE HAVING ELECTRONIC MOTOR AND CONTROLLER UNIT, AND DRIVE DEVICE

(71) Applicant: DENSO CORPORATION, Kariya-city (JP)

(72) Inventor: Tomoaki Yoshimi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 196 days.

(21) Appl. No.: 18/601,768

(22) Filed: Mar. 11, 2024

(65) Prior Publication Data

US 2024/0213858 A1     Jun. 27, 2024

Related U.S. Application Data

(63) Continuation of application No. PCT/JP2022/033452, filed on Sep. 6, 2022.

(30) Foreign Application Priority Data

Sep. 14, 2021     (JP) ................................. 2021-149768

(51) Int. Cl.
  *H02K 5/22*      (2006.01)
  *H02K 11/33*     (2016.01)
  *H02K 15/00*     (2025.01)

(52) U.S. Cl.
  CPC ............. *H02K 11/33* (2016.01); *H02K 5/225* (2013.01); *H02K 15/00* (2013.01); *H02K 2211/03* (2013.01)

(58) Field of Classification Search
  CPC .......... H02K 5/22; H02K 5/225; H02K 11/30; H02K 11/33; H02K 15/00; H02K 2211/03
  See application file for complete search history.

(56) References Cited

U.S. PATENT DOCUMENTS

| | | | |
|---|---|---|---|
| 2011/0034073 A1* | 2/2011 | Umfahrer | .......... H01R 13/5202 439/587 |
| 2014/0170878 A1* | 6/2014 | Jocham | ................ H01R 43/005 439/271 |
| 2016/0204670 A1 | 7/2016 | Yamasaki | |
| 2021/0221426 A1* | 7/2021 | Kanno | ................... B62D 5/046 |
| 2021/0265899 A1* | 8/2021 | Yamada | ............... B62D 5/0403 |

OTHER PUBLICATIONS

U.S. Appl. No. 18/511,606 and its entire file history.

\* cited by examiner

*Primary Examiner* — Eric Johnson
(74) *Attorney, Agent, or Firm* — Precision Patents, P.C.

(57)     ABSTRACT

One end portion of each connector terminal is connected to an end circuit board of an end circuit board assembly. In a first process, a generic circuit board assembly is assembled to a motor frame. In a second process, the end circuit board assembly is assembled to the generic circuit board assembly. In a third process, the other end portion of each connector terminal of the end circuit board assembly is exposed in a mating bore of a corresponding connector, and a connector housing is assembled. The third process is carried out such that a load, which is generated when the other end portion of each connector terminal is exposed in the mating bore of the corresponding connector in the third process, is smaller than a load, which is generated in the first process, and a load, which is generated in the second process.

7 Claims, 27 Drawing Sheets

FIRST EMBODIMENT

CONNECTOR TERMINAL BINDER

END CIRCUIT BOARD

INTER-BOARD TERMINAL BINDER

GENERIC CIRCUIT BOARD

INTER-BOARD TERMINAL BINDER

FIRST EMBODIMENT

COMPARATIVE EXAMPLE 1

COMPARATIVE EXAMPLE 2

MANUFACTURING METHOD USING HOOK JIG (EMBODIMENT EXAMPLE 1)

MANUFACTURING METHOD USING HOOK JIG (EMBODIMENT EXAMPLE 1)

MANUFACTURING METHOD USING HOOK JIG (EMBODIMENT EXAMPLE 1)

MANUFACTURING METHOD USING HOOK JIG  (EMBODIMENT EXAMPLE 2)

MANUFACTURING METHOD USING HOOK JIG  (EMBODIMENT EXAMPLE 2)

SECOND EMBODIMENT

THIRD EMBODIMENT

FOURTH EMBODIMENT

MODIFICATION OF FOURTH EMBODIMENT

FIFTH EMBODIMENT

SIXTH EMBODIMENT

CONNECTOR TERMINAL BINDER (TWO-GROUP COUPLING)

CONNECTOR TERMINAL BINDER (FOUR-GROUP COUPLING)

SEVENTH EMBODIMENT

SEVENTH EMBODIMENT (EMBODIMENT EXAMPLE 1)

SEVENTH EMBODIMENT (EMBODIMENT EXAMPLE 2)

SEVENTH EMBODIMENT (EMBODIMENT EXAMPLE 3)

EIGHTH EMBODIMENT

BOARD-TO-BOARD CONNECTOR

EIGHTH EMBODIMENT

SOCKET CONNECTOR + PIN HEADER TYPE

METHOD FOR MANUFACTURING DRIVE DEVICE HAVING ELECTRONIC MOTOR AND CONTROLLER UNIT, AND DRIVE DEVICE

CROSS REFERENCE TO RELATED APPLICATIONS

This application is a continuation application of International Patent Application No. PCT/JP2022/033452 filed on Sep. 6, 2022, which designated the U.S. and claims the benefit of priority from Japanese Patent Application No. 2021-149768 filed on Sep. 14, 2021. The entire disclosures of all of the above applications are incorporated herein by reference.

TECHNICAL FIELD

The present disclosure relates to a method for manufacturing a drive device, and the drive device.

BACKGROUND

Previously, there has been proposed a drive device that includes an electric motor and a controller unit which are integrally formed together. For example, in the previously proposed drive device, one of a plurality of connectors, which are formed at a cover member, has a plurality of power supply connector terminals extending in an axial direction, and the other connectors respectively have a plurality of signal connector terminals extending in the axial direction. Each of these connector terminals is a press-fit terminal which is resiliently deformable. Each of these press-fit terminals is press-fitted to and is thereby connected to a corresponding one of electrically conductive connecting portions of a circuit board.

SUMMARY

This section provides a general summary of the disclosure, and is not a comprehensive disclosure of its full scope or all of its features.

According to the present disclosure, there is provided a method for manufacturing a drive device. The drive device includes: an electric motor; a controller unit; a motor frame; at least two circuit boards; a connector housing; a plurality of inter-board terminals or an inter-board connector; a plurality of connector terminals; and at least one connector terminal binder. The controller unit is placed on one side of the electric motor in an axial direction of the electric motor and is configured to control a drive operation of the electric motor. The motor frame is made of metal and is installed to an end portion of the electric motor. Each of the at least two circuit boards holds at least one electronic component of the controller unit and is stacked at a corresponding one of a plurality of stacking levels on an opposite side of the motor frame which is opposite to the electric motor. The at least two circuit boards include: an end circuit board which is farthest from the motor frame among the at least two circuit boards; and at least one generic circuit board which is other than the end circuit board. The connector housing is made of resin and is shaped in a bottomed tubular form and thereby has a top plate portion and an outer tubular portion. The top plate portion is opposed to the end circuit board. The outer tubular portion extends from an outer periphery of the top plate portion toward the electric motor and has an end portion fixed to one of the electric motor and the motor frame. The connector housing has at least one connector. The at least one connector is formed at the top plate portion and has a mating bore which opens toward a side opposite to the end circuit board. The at least one generic circuit board is only one generic circuit board or at least two generic circuit boards. In one case where the at least one generic circuit board is the only one generic circuit board, the inter-board connector or each corresponding one of the plurality of inter-board terminals is joined between the only one generic circuit board and the end circuit board. In another case where the at least one generic circuit board is the at least two generic circuit boards, the inter-board connector or each corresponding one of the plurality of inter-board terminals is joined between corresponding two of the at least two generic circuit boards. The at least one connector is one or at least two connectors. Each of the at least one connector is provided with a corresponding connector terminal group, which includes at least two connector terminals among the plurality of connector terminals and is configured such that one end portion of each connector terminal included in the corresponding connector terminal group is joined to the end circuit board, and another end portion of each connector terminal included in the corresponding connector terminal group is exposed in the mating bore of a corresponding one of the at least one connector. The at least one connector terminal binder is made of resin and includes one or at least two connector terminal binders. Each of the at least one connector terminal binder is provided to a corresponding one of the at least one connector to hold an intermediate portion of each connector terminal included in the corresponding connector terminal group of the corresponding one of the at least one connector and thereby bundle the corresponding connector terminal group of the corresponding one of the at least one connector, or each of the at least one connector terminal binder is provided to adjacent two or more of the at least two connectors to hold the intermediate portion of each connector terminal included in the corresponding connector terminal group of each of the adjacent two or more of the at least two connectors and thereby bundle the corresponding connector terminal group of each of the adjacent two or more of the at least two connectors. The at least one generic circuit board, to which an end portion of each corresponding one of the plurality of inter-board terminals or a portion of the inter-board connector is joined, is defined as at least one generic circuit board assembly. In the one case where the at least one generic circuit board is the only one generic circuit board, the at least one generic circuit board assembly is only one generic circuit board assembly. In the another case where the at least one generic circuit board is the at least two generic circuit boards, the at least one generic circuit board assembly is at least two generic circuit board assemblies. The end circuit board, to which the one end portion of each of the plurality of connector terminals bound by the at least one connector terminal binder is joined, or additionally another portion of the inter-board connector is joined besides the one end portion of each of the plurality of connector terminals bound by the at least one connector terminal binder, is defined as an end circuit board assembly.

The method includes a first process, a second process and a third process. The first process includes assembling the at least one generic circuit board assembly to the motor frame. In the one case where the at least one generic circuit board assembly is the only one generic circuit board assembly, which is placed at a lowest one of the plurality of stacking levels, the only one generic circuit board assembly is assembled to the motor frame. In the another case where the at least one generic circuit board assembly is the at least two generic circuit board assemblies, a lowest one of the at least two generic circuit board assemblies, which is placed at the lowest one of the plurality of stacking levels, is assembled to the motor frame, and a rest of the at least two generic circuit board assemblies is sequentially assembled to the lowest one of the at least two generic circuit board assemblies until a highest one of the at least two generic circuit board assemblies, which is placed immediately below the end circuit board, is assembled.

The second process includes assembling the end circuit board assembly to the at least one generic circuit board assembly after the first process. In the one case where the at least one generic circuit board assembly is the only one generic circuit board assembly, the end circuit board assembly is assembled to the only one generic circuit board assembly. In the another case where the at least one generic circuit board assembly is the at least two generic circuit board assemblies, the end circuit board assembly is assembled to the highest one of the at least two generic circuit board assemblies.

The third process includes exposing the another end portion of each of the plurality of connector terminals of the end circuit board assembly in the mating bore of the corresponding one of the at least one connector and placing the connector housing to cover the end circuit board assembly and the at least one generic circuit board assembly with the connector housing and fixing the outer tubular portion to the one of the electric motor and the motor frame after the second process.

The third process is carried out such that a load, which is generated when the another end portion of each of the plurality of connector terminals is exposed in the mating bore of the corresponding one of the at least one connector in the third process, is smaller than a load, which is generated in the first process, and a load, which is generated in the second process.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
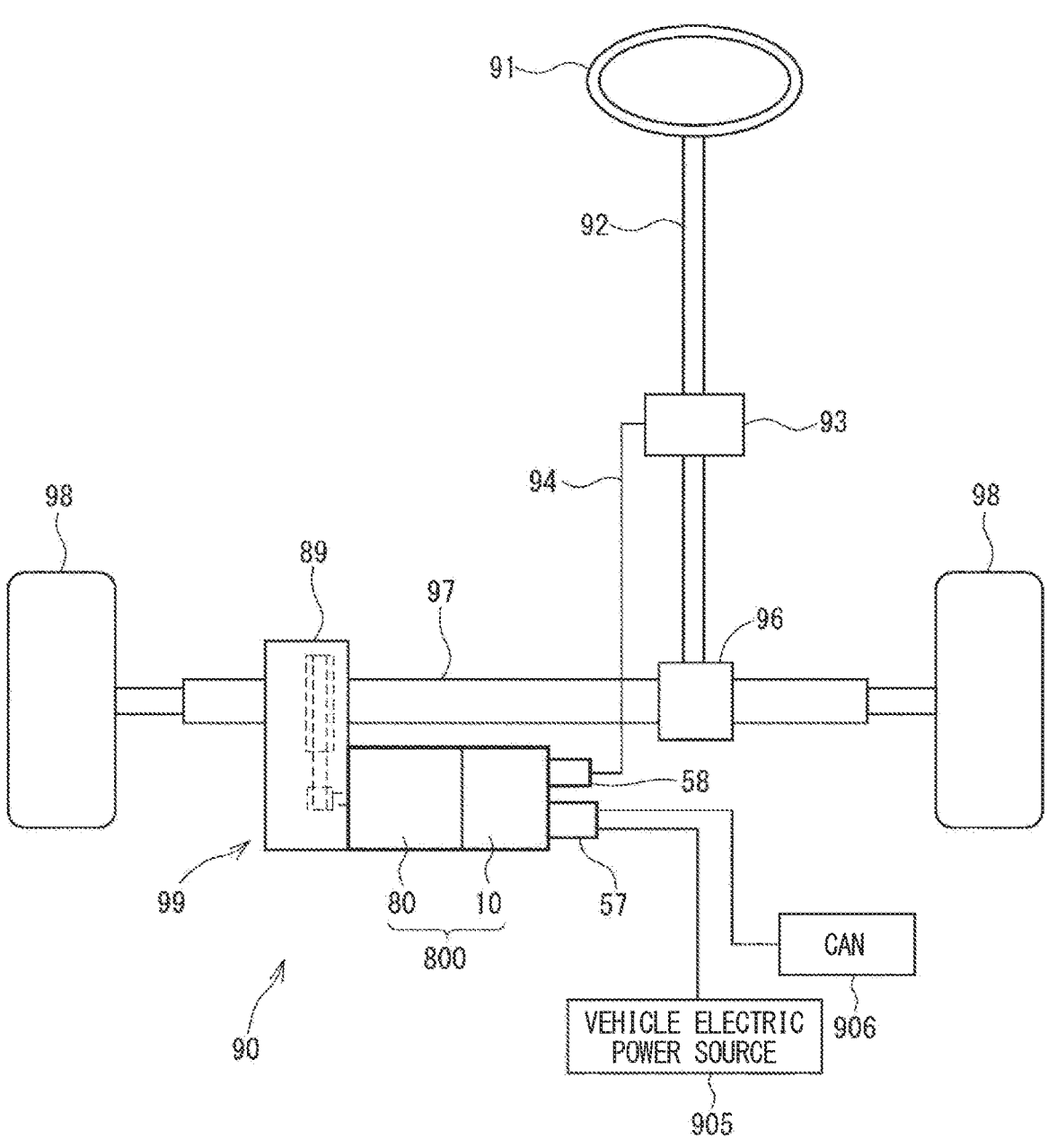
FIG. 1 is a schematic diagram of an electric power steering system to which a drive device is applied.

Previously, there has been proposed a drive device that includes an electric motor and a controller unit which are integrally formed together. For example, in the previously proposed drive device, one of a plurality of connectors, which are formed at a cover member, has a plurality of power supply connector terminals extending in an axial direction, and the other connectors respectively have a plurality of signal connector terminals extending in the axial direction. Each of these connector terminals is a press-fit terminal which is resiliently deformable. Each of these press-fit terminals is press-fitted to and is thereby connected to a corresponding one of electrically conductive connecting portions of a circuit board.

In the previously proposed drive device described above, at the time of assembling the cover member to a frame member by moving the cover member toward the frame member, each of the connector terminals can be easily assembled to the circuit board by the press-fitting even though the connecting location between the connector terminal and the circuit board is invisible. This assembly process is so called a blind connection assembly process. However, the previously proposed drive device has the structure where the circuit board is the only one circuit board, and the connector terminals are directly connected to the circuit board.

In contrast to this structure, there has been proposed a structure that includes at least two circuit boards (two or more circuit boards) each of which is stacked at a corresponding one of stacking levels to form a stack of circuit boards in the controller unit. Hereinafter, among the at least two circuit boards, a circuit board, which is closest to the connectors, is referred to as an end circuit board, and each of the rest of the at least two circuit boards, which is other than the end circuit board, is referred to as a generic circuit board. Furthermore, in the drive device which has, for example, the two circuit boards, an inverter circuit, which provides electric power to motor windings, is installed at the generic circuit board. Components, such as a filter circuit and a communication driver, are installed at the end circuit board. The generic circuit board and the end circuit board are connected with each other through a plurality of inter-board terminals or an inter-board connector, such as a board-to-board connector.

If the technique of the previously proposed drive device is applied to the drive device having a two-board structure (i.e., a structure having the two circuit boards), a series of assembling processes may be carried out as follows. <1> A generic circuit board assembly is assembled to the frame member. Here, the generic circuit board, to which one end portion of each of the inter-board terminals or a portion of the inter-board connector is joined, is defined as the generic circuit board assembly. <2> The end circuit board is assembled to the generic circuit board assembly. <3> The cover member, in which the connector terminals are insert-molded, is brought close to the end circuit board, and the end portions of the connector terminals are press-fitted to and are thereby connected to the end circuit board. The process <3> becomes the blind connection assembly process.

In the single-board structure (i.e., a structure having the single circuit board) of the previously proposed drive device, the circuit board, to which the connector terminals are press-fitted and are thereby connected, is directly supported by the frame member, and thereby, the frame member receives a press-fit load. In contrast, in the two-board structure, a support is absent at a location immediately below the end circuit board. Therefore, the end circuit board may be disadvantageously flexed by the press-fit load generated in the process <3>. Furthermore, in the structure having three or more circuit boards, the generic circuit board(s), which is other than the lowest generic circuit board, may have the similar disadvantage which is similar to the above-described disadvantage. Therefore, the technique of the previously proposed drive device cannot be applied to the drive device that has the structure having two or more circuit boards.

A drive device to be manufactured by a method for manufacturing the drive device according to the present disclosure includes: an electric motor which includes a stator and a rotor; and a controller unit which is placed on one side of the electric motor in an axial direction of the electric motor and is configured to control a drive operation of the electric motor, while the electric motor and the controller unit are integrally formed together. The drive device includes: a motor frame made of metal; at least two circuit boards; a connector housing made of resin; a plurality of inter-board terminals or an inter-board connector; a plurality of connector terminals; and at least one connector terminal binder made of resin.

The motor frame is installed to an end portion of the electric motor which faces the controller unit in the axial direction of the electric motor. Each of the at least two circuit boards is stacked at a corresponding one of a plurality of stacking levels on an opposite side of the motor frame which is opposite to the electric motor. The at least two circuit boards include: an end circuit board which is farthest from the motor frame among the at least two circuit boards; and at least one generic circuit board which is other than the end circuit board. Each of the at least two circuit boards holds at least one electronic component of the controller unit.

The connector housing is shaped in a bottomed tubular form and thereby has: a top plate portion which is opposed to the end circuit board; and an outer tubular portion which extends from an outer periphery of the top plate portion toward the electric motor and has an end portion fixed to one of the electric motor and the motor frame. The connector housing has at least one connector. The at least one connector is formed at the top plate portion and has a mating bore which opens toward a side opposite to the end circuit board.

The at least one generic circuit board is only one generic circuit board or at least two generic circuit boards. In one case where the at least one generic circuit board is the only one generic circuit board, the inter-board connector or each of the plurality of inter-board terminals is joined between the only one generic circuit board and the end circuit board. In another case where the at least one generic circuit board is the at least two generic circuit boards, the inter-board connector or each corresponding one of the plurality of inter-board terminals is joined between corresponding two of the at least two generic circuit boards. The at least one connector is one or at least two connectors. Each of the at least one connector is provided with a corresponding connector terminal group, which includes at least two connector terminals among the plurality of connector terminals and is configured such that one end portion of each connector terminal included in the corresponding connector terminal group is joined to the end circuit board, and another end portion of each connector terminal included in the corresponding connector terminal group is exposed in the mating bore of a corresponding one of the at least one connector.

The at least one connector terminal binder includes one or at least two connector terminal binders. Each of the at least one connector terminal binder is provided to a corresponding one of the at least one connector to hold an intermediate portion of each connector terminal included in the corresponding connector terminal group of the corresponding one of the at least one connector and thereby bundle the corresponding connector terminal group of the corresponding one of the at least one connector, or each of the at least one connector terminal binder is provided to adjacent two or more of the at least two connectors to hold the intermediate portion of each connector terminal included in the corresponding connector terminal group of each of the adjacent two or more of the at least two connectors and thereby bundle the corresponding connector terminal group of each of the adjacent two or more of the at least two connectors.

The at least one generic circuit board, to which an end portion of each corresponding one of the plurality of inter-board terminals or a portion of the inter-board connector is joined, is defined as at least one generic circuit board assembly. In the one case where the at least one generic circuit board is the only one generic circuit board, the at least one generic circuit board assembly is only one generic circuit board assembly. In the another case where the at least one generic circuit board is the at least two generic circuit boards, the at least one generic circuit board assembly is at least two generic circuit board assemblies. The end circuit board, to which the one end portion of each of the plurality of connector terminals bound by the at least one connector terminal binder is joined, or additionally another portion of the inter-board connector is joined besides the one end portion of each of the plurality of connector terminals bound by the at least one connector terminal binder, is defined as an end circuit board assembly.

The method for manufacturing the drive device according to the present disclosure includes a first process, a second process and a third process. The first process includes assembling the at least one generic circuit board assembly to the motor frame. In the one case where the at least one generic circuit board assembly is the only one generic circuit board assembly, which is placed at a lowest one of the plurality of stacking levels, the only one generic circuit board assembly is assembled to the motor frame. In the another case where the at least one generic circuit board assembly is the at least two generic circuit board assemblies, a lowest one of the at least two generic circuit board assemblies, which is placed at the lowest one of the plurality of stacking levels, is assembled to the motor frame, and a rest of the at least two generic circuit board assemblies is sequentially assembled to the lowest one of the at least two generic circuit board assemblies until a highest one of the at least two generic circuit board assemblies, which is placed immediately below the end circuit board, is assembled.

The second process includes assembling the end circuit board assembly to the at least one generic circuit board assembly after the first process. In the one case where the at least one generic circuit board assembly is the only one generic circuit board assembly, the end circuit board assembly is assembled to the only one generic circuit board assembly. In the another case where the at least one generic circuit board assembly is the at least two generic circuit board assemblies, the end circuit board assembly is assembled to the highest one of the at least two generic circuit board assemblies.

The third process includes exposing the another end portion of each of the plurality of connector terminals of the end circuit board assembly in the mating bore of the corresponding one of the at least one connector and placing the connector housing to cover the end circuit board assembly and the at least one generic circuit board assembly with the connector housing and fixing the outer tubular portion to the one of the electric motor and the motor frame after the second process.

The third process is carried out such that a load, which is generated when the another end portion of each of the plurality of connector terminals is exposed in the mating bore of the corresponding one of the at least one connector in the third process, is smaller than a load, which is generated in the first process, and a load, which is generated in the second process.

According to the present disclosure, the plurality of connector terminals are bundled by the at least one connector terminal binder and are connected to the end circuit board in a sub-assembling process. Furthermore, in the third process, which becomes the blind connection assembly process, a load, which is generated at the time of exposing the another end portion of each of the plurality of connector terminals of the end circuit board assembly in the mating bore of the corresponding one of the at least one connector, is the smallest among the loads generated in the assembling processes. Therefore, flexure of the end circuit board is limited.

In the drive device of a first aspect of the present disclosure, to which the above method is applied, a bottom of the mating bore of each of the at least one connector may have a bottom hole. Each of the at least one connector terminal binder may cover the bottom hole of the corresponding one of the at least one connector or the bottom holes of the adjacent two or more of the at least two connectors from a side at which the end circuit board is placed. Alternatively, each of the at least one connector terminal binder may be fitted to the bottom hole of the corresponding one of the at least one connector or the bottom holes of the adjacent two or more of the at least two connectors.

In the drive device of a second aspect of the present disclosure, to which the above method is applied, each connector terminal included in the corresponding connector terminal group may be inserted through a corresponding one of a plurality of terminal insertion holes formed at a bottom of the mating bore of a corresponding one of the at least one connector and may be exposed in the mating bore of the corresponding one of the at least one connector. Each of the plurality of connector terminals may be fitted to the corresponding one of the plurality of terminal insertion holes formed at the bottom of the mating bore of the corresponding one of the at least one connector through resilient deformation of at least one of: each of the plurality of connector terminals; and the corresponding one of the plurality of terminal insertion holes formed at the bottom of the mating bore of the corresponding one of the at least one connector.

With the structure of the first aspect and the structure of the second aspect, a load, which is generated at the time of exposing the another end portion of each connector terminal in the mating bore of the corresponding one of the at least one connector, can be reduced. Therefore, the assembling operation in the third process, which becomes the blind connection assembly process, becomes easier, and the manufacturing quality becomes more stable.

Hereinafter, a plurality of embodiments will be described with reference to the drawings for a method for manufacturing a drive device, and the drive device. The same reference signs are given to substantially the same portions among the embodiments, and the redundant description thereof will be omitted for the sake of simplicity. Furthermore, the first to eighth embodiments are collectively referred to as the present embodiment. The drive device of the present embodiment is used as, for example, a steering assist motor of an electric power steering system and includes an electric motor and a controller unit while the controller unit is configured to control a drive operation of the electric motor.

(Structure of Electric Power Steering System)

A structure of the electric power steering system 99 will be schematically described with reference to FIG. 1. Although FIG. 1 shows a rack-assist type electric power steering system, a drive device 800 of the present embodiment can be equally applied to a column-assist type electric power steering system. A steering system 90, which includes the electric power steering system 99, includes a steering wheel 91, a steering shaft 92, a pinion gear 96, a rack shaft 97, wheels 98 and the electric power steering system 99.

A torque sensor 93, which senses a steering torque, is installed to the steering shaft 92 to which the steering wheel 91 is coupled. The pinion gear 96, which is meshed with the rack shaft 97, is installed to a distal end portion of the steering shaft 92. When a human driver of a vehicle rotates the steering wheel 91, a rotational motion of the steering shaft 92 is converted into a linear motion of the rack shaft 97 through the pinion gear 96. Each of the two wheels 98, which are respectively coupled to two opposite end portions of the rack shaft 97, is steered to an angle that corresponds to an amount of displacement of the rack shaft 97.

The electric power steering system 99 includes: the drive device 800 which includes the electric motor 80 and the controller unit 10 integrally formed together; and reduction gears 89 which reduce a rotational speed of rotation outputted from the electric motor 80 and transmit the rotation having the reduced rotational speed to the rack shaft 97. The electric motor 80 is a three-phase brushless motor having two systems which include two sets of three-phase windings, respectively. The controller unit (also referred to as a controller circuitry) 10 has at least a structure having two drive systems where two system inverter circuits respectively supply the electric power to the two sets of three-phase windings. The electric motor 80 outputs a steering assist torque when a three-phase AC power, which is converted from a DC power by the inverter circuit of the controller unit 10, is supplied to the electric motor 80.

The DC power is supplied from a vehicle electric power source 905 to each of a plurality of vehicle-system connectors 57 of the controller unit 10, and communication signals for communicating with a vehicle communication network (CAN shown in FIG. 1) 906 are inputted to and/or outputted from each of the vehicle-system connectors 57. A sensor signal, which is sensed with the torque sensor 93, is inputted to each of a plurality of signal-system connectors 58 through a cable harness 94. The vehicle-system connectors 57 and the signal-system connectors 58 are respectively formed as connectors each of which has its own mating bore that is separated from the mating bores of the other connectors. Here, the mating bore of the connector 57, 58 is a bore that receives a portion of a corresponding external connector of the cable harness.

(Structure of Drive Device)

Figure 2:
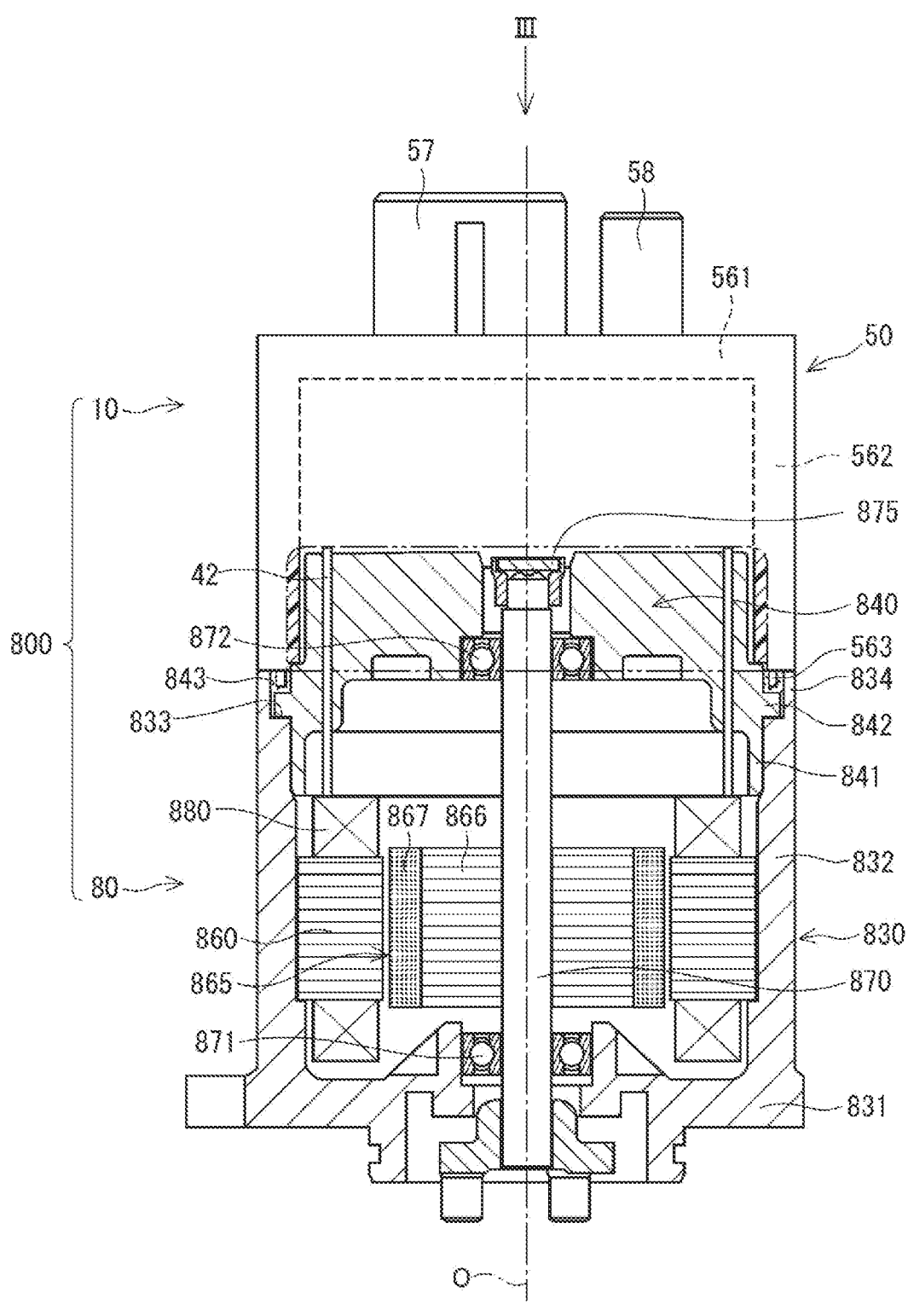
FIG. 2 is a partial cross-sectional view of an electric motor of the drive device.
Figure 3:
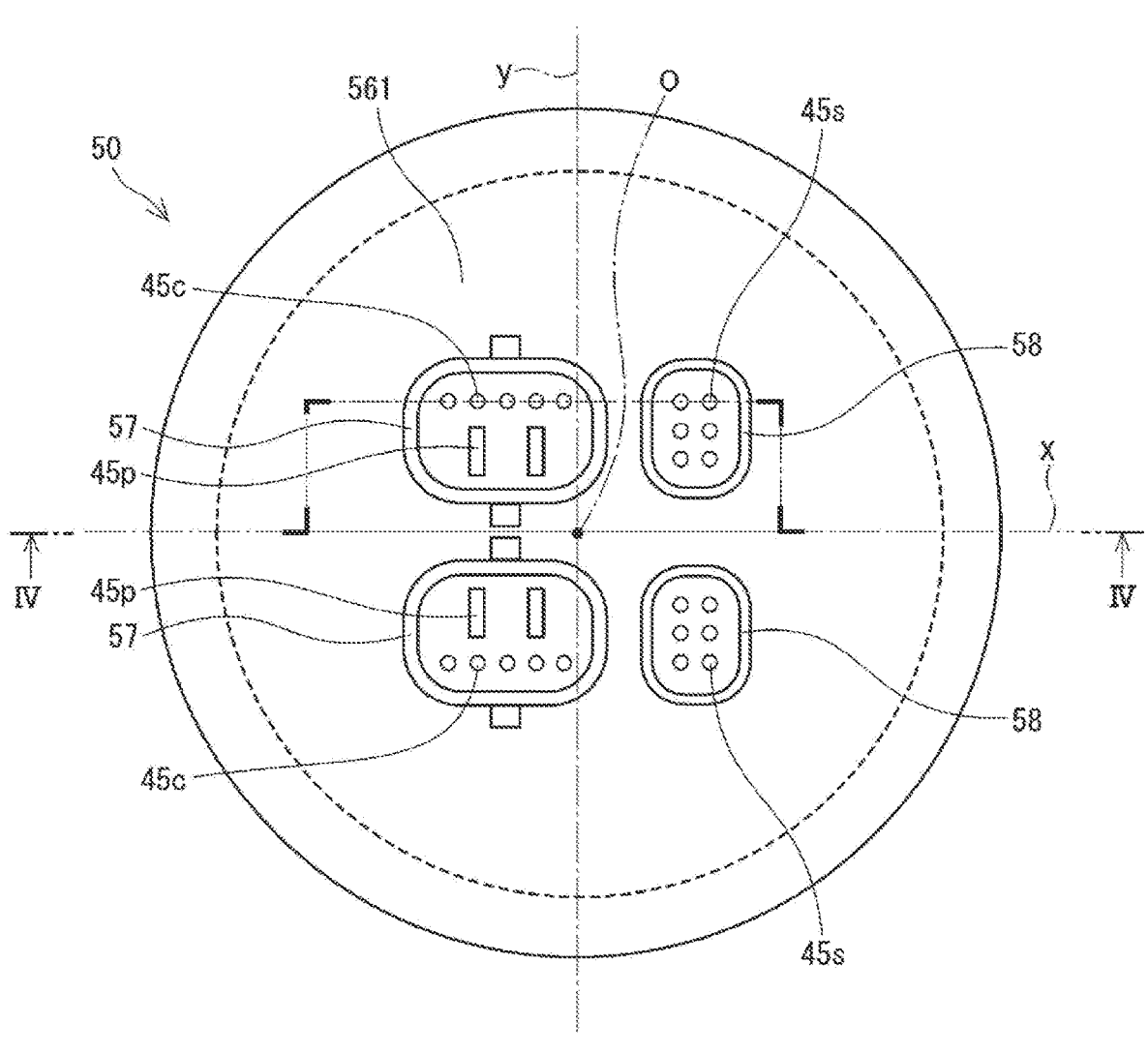
FIG. 3 is a view taken in a direction of an arrow III in FIG. 2.

With reference to FIGS. 2 and 3, an overall structure of the drive device 800 will be described. A direction, which is parallel with a rotational axis O of the electric motor 80 shown in FIG. 2, will be referred to as an axial direction, and a view taken from the upper side in FIG. 2, will be referred to as a plan view. The controller unit 10 is placed on one side of the electric motor 80 in the axial direction. Specifically, the drive device 800 forms an integrated electrical and mechanical type structure.

The electric motor 80 includes a motor case 830, a motor frame 840, a stator 860 and a rotor 865. The motor case 830 is shaped in a bottomed tubular form and thereby has a bottom portion 831 and a tubular portion 832, and the controller unit 10 is placed at an opening side of the motor case 830. A groove-forming wall 834, which has a relatively thin plate thickness, is formed at an opening-side end part of the tubular portion 832 by a stepped portion 833.

The stator 860 is fixed at an inside of the tubular portion 832 of the motor case 830, and three-phase motor windings 880 are wound around the stator 860. The controller unit 10 controls the energization of the motor windings 880 to generate a rotating magnetic field at the stator 860. The rotor 865 is placed on a radially inner side of the stator 860, and a shaft 870 is fixed at a center of the rotor 865. The shaft 870 is rotatably supported by a front bearing 871, which is held by the bottom portion 831 of the motor case 830, and a rear bearing 872, which is held by the motor frame 840.

A plurality of permanent magnets 867 are installed at an outer periphery of a rotor core 866 of the rotor 865. The rotor 865 is rotated about the axis of the shaft 870 by the rotating magnetic field generated at the stator 860. A sensor magnet 875 for sensing a rotational angle is installed at an end portion of the shaft 870 which faces the controller unit 10.

The motor frame 840 is installed to an end portion of the electric motor 80 which faces the controller unit 10 in the axial direction of the electric motor 80. The motor frame 840 is made of, for example, an aluminum alloy and includes a frame portion 841 and a flange portion 842. The frame portion 841 is press-fitted at the inside of the motor case 830. The flange portion 842, which is formed at an outer periphery of the frame portion 841, contacts the stepped portion 833 of the motor case 830. A seal groove 843, which is filled with a bonding agent, is formed at an annular space that is defined by an outer wall of the frame portion 841, a surface of the flange portion 842 which faces the controller unit 10 in the axial direction, and an inner wall of the groove-forming wall 834 of the motor case 830. The motor frame 840 also functions as a heat sink that releases the heat generated at the time of energization of the controller unit 10.

The connector housing 50 is made of a resin material, such as PBT. The connector housing 50 is shaped in a bottomed tubular form and thereby has a top plate portion 561 and an outer tubular portion 562. A projection 563, which projects in the axial direction and is shaped in a ring form, is formed at a distal end of the outer tubular portion 562. The outer tubular portion 562 is fixed to the electric motor 80 or the motor frame 840 by inserting the projection 563 into the seal groove 843. The connectors 57, 58, each of which has the mating bore that opens toward the side opposite to the electric motor 80, are formed at the top plate portion 561.

FIG. 3 shows an exemplary arrangement of the connectors 57, 58. Although FIG. 3 is a view taken in a direction of an arrow III in FIG. 2, FIG. 3 is illustrated not to scale with FIG. 2 but to scale with FIGS. 6A, 6B, 7A and 7B, each of which is a plan view showing components at the inside of the controller unit 10. An x-axis is defined in a horizontal direction of FIG. 3, and a y-axis is defined in a vertical direction of FIG. 3. The x-axis and the y-axis will be referred to with respect to views of an inter-board terminal binder 63 and a plurality of connector terminal binders 65.

Two sets of vehicle-system connectors 57 and two sets of signal-system connectors 58 may be provided, as shown in FIG. 3, for the purpose of redundancy, or a single set of vehicle-system connector 57 and a single set of signal-system connector 58 may be provided in another arrangement example. The structure, in which the two sets of vehicle-system connectors 57 and the two sets of signal-system connectors 58 are provided, is mainly used in a drive device of a full dual-system, in which two system inverter circuits are respectively connected to two independent electric power sources, and various signals are redundantly inputted and outputted. In contrast, the single set of vehicle-system connector 57 and the single set of signal-system connector 58 are mainly used in a drive device having two drive systems where two system inverter circuits are connected in parallel to a common electric power source, and various signals are used commonly among the two systems. Since the present embodiment does not mention the structure of each of the two systems, in FIG. 3, the two sets of vehicle-system connectors are both indicated with the common reference sign 57, and the two sets of signal-system connectors are both indicated with the common reference sign 58.

Figure 4:
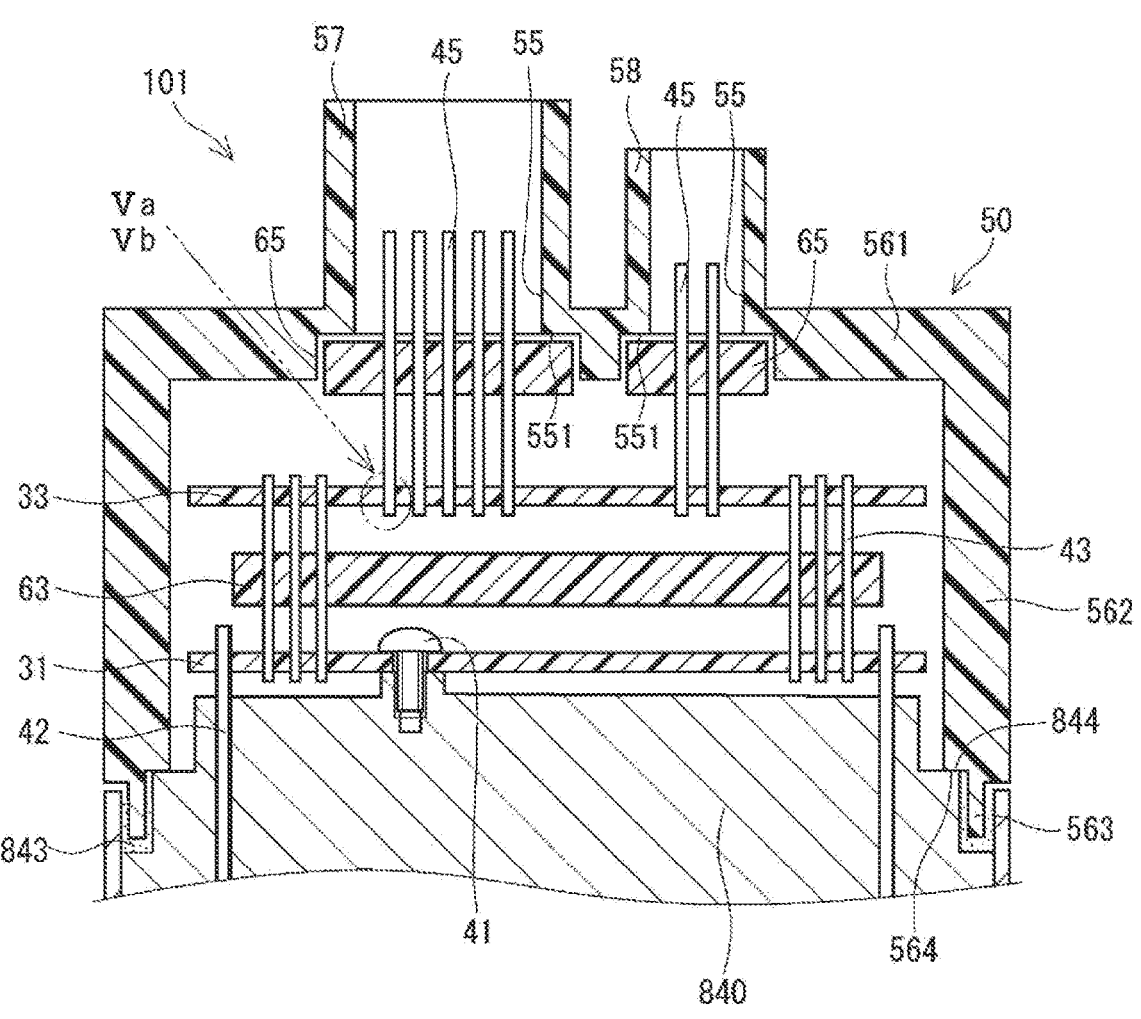
FIG. 4 is a schematic cross-sectional view of a controller unit according to a first embodiment.

Each of the vehicle-system connectors 57 has two power source terminals 45p and, for example, five communication terminals 45c. The power source terminals 45p include a positive power source terminal, which is connected to a positive electrode of the vehicle electric power source 905, and a ground terminal connected to a ground (earth). The communication terminals 45c are connected to the vehicle communication network (such as CAN) 906. Each of the power source terminals 45p, which conducts a large electric current, has a connecting portion which is connected to the cable harness and is shaped in a prismatic form. Each of the signal-system connectors 58 has, for example, six sensor terminals 45s which are connected to the cable harness 94 extending from the torque sensor 93. Reference signs 45p, 45c, which indicate types of the connector terminals 45, are used only in FIG. 3. In FIG. 4 and the following drawings, the term "connector terminal 45" is uniformly used without distinguishing between the applications thereof.

At least two circuit boards, each of which holds at least one electronic component of the controller unit 10, are received at the inside of the connector housing 50. Each of the at least two circuit boards is stacked at a corresponding one of a plurality of stacking levels to form a stack of circuit boards on an opposite side (upper side in FIG. 2) of the motor frame 840 which is opposite to the electric motor 80. In the present embodiment, a suitable assembling method for assembling the at least two circuit boards in sequence as well as a preferred configuration of the controller unit suitable for such an assembling method are provided.

Next, the structure of the controller unit of each of the embodiments will be described in sequence. The controller unit of each of the first to seventh embodiments is indicated by a corresponding reference sign that has the number of the embodiment at a third digit following "10." The connector housings of the first to sixth embodiments differ significantly in structure from the connector housing of the seventh embodiment. The connector housings of the first to sixth embodiments are each indicated by the reference sign 50 although details of these connector housings differ from each other. The connector housing of the seventh embodiment is indicated by a unique reference sign 507. In the first to eighth embodiments, the number of the circuit boards is two. A structure, which has three or more circuit boards, will be described later as other embodiments.

First Embodiment

Figure 6A:
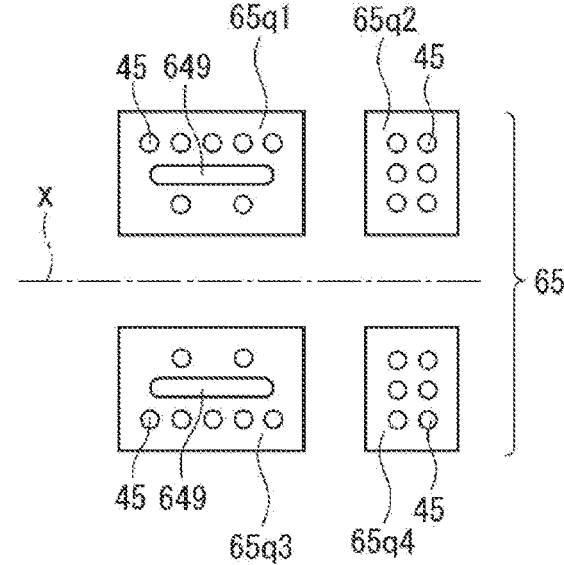
FIG. 6A is a plan view of a connector terminal binder.
Figure 7A:
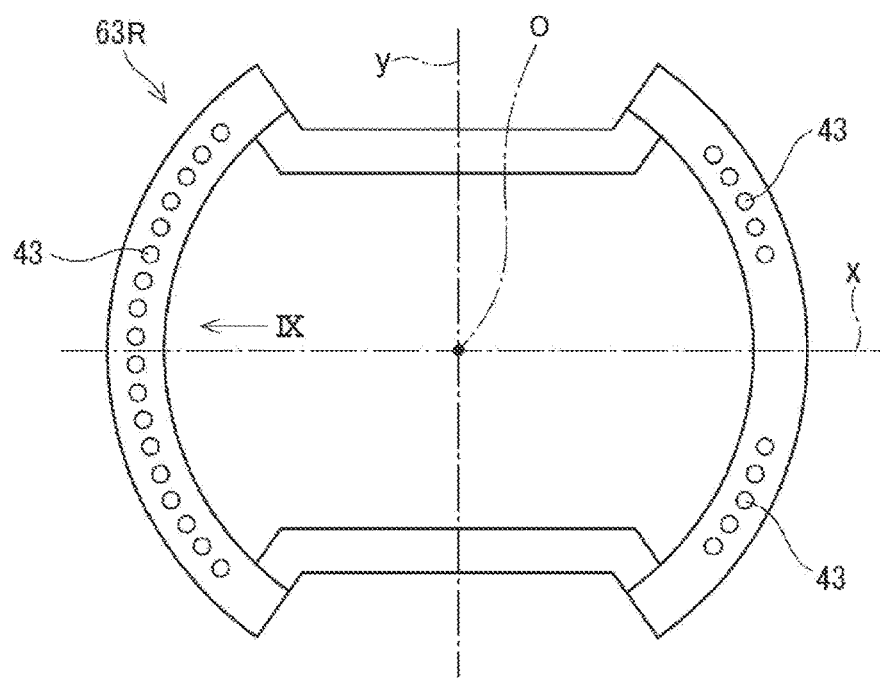
FIG. 7A is a plan view of an inter-board terminal binder according to one embodiment example of the first embodiment.
Figure 8:
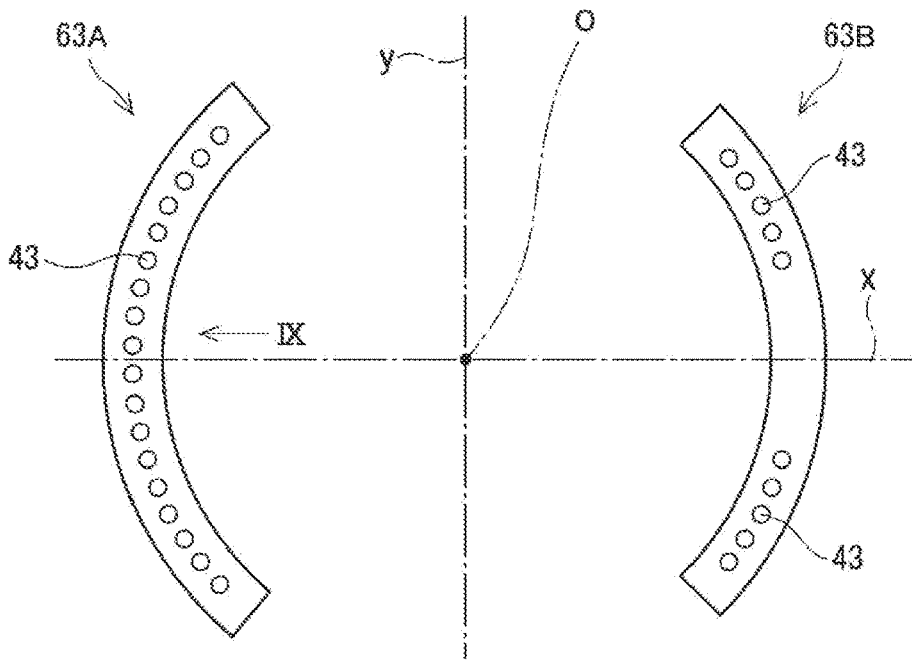
FIG. 8 is a plan view of inter-board terminal binders according to another embodiment example of the first embodiment.
Figure 9:
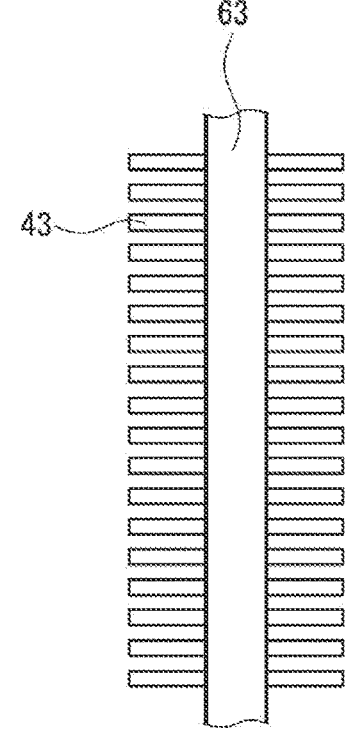
FIG. 9 is a view of the inter-board terminal binder taken in a direction of an arrow IX in FIGS. 7A and 8.
Figure 10:
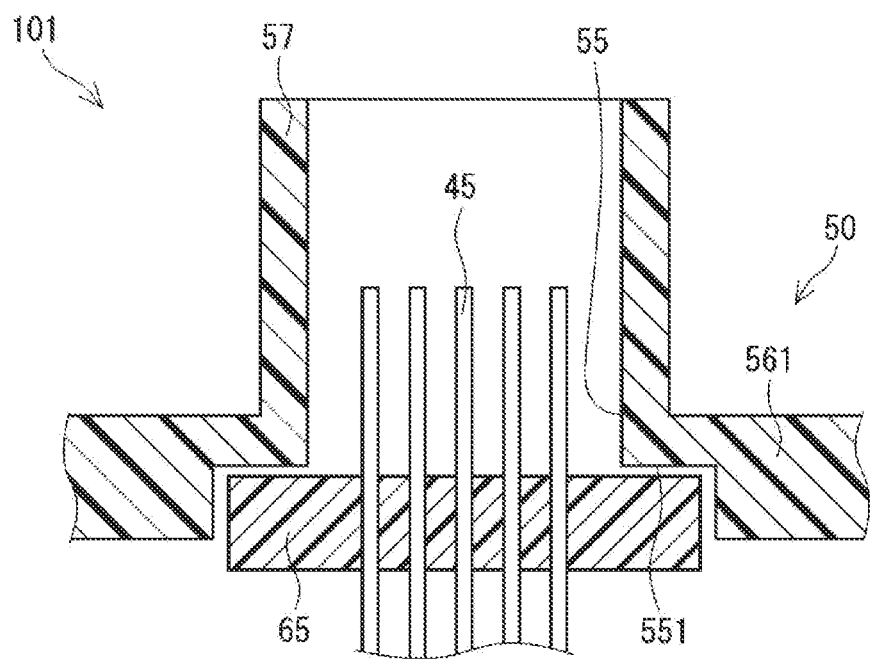
FIG. 10 is an enlarged schematic cross-sectional view of a connector bottom portion (a connecting portion between a connector terminal binder and a connector bottom hole) according to the first embodiment.

The structure of the controller unit 101 of the first embodiment will be described with reference to FIGS. 4 to 10. FIG. 4 shows an overall schematic cross-sectional view, and FIGS. 5A and 5B respectively show an enlarged cross-sectional view of a connecting portion between the connector terminal 45 and an end circuit board 33. FIGS. 6A, 6B, 7A and 7B respectively show a plan view of the connector terminal binders 65, a plan view of the end circuit board 33, a plan view of the inter-board terminal binder 63 and a plan view of a generic circuit board 31. FIG. 8 shows a plan view of inter-board terminal binders 63 of another embodiment example, and FIG. 9 shows a view taken in a direction of an arrow IX in FIG. 8. FIG. 10 shows an enlarged schematic cross-sectional view of a connector bottom portion.

As shown in FIG. 4, two circuit boards, i.e., a generic circuit board 31 and an end circuit board 33 are arranged sequentially from the motor frame 840 side. In this description, a name of each of the circuit boards is distinguished exclusively by a location of the circuit board, regardless of the function or the like of the electronic components installed on the circuit board. The circuit board, which is farthest from the motor frame 840, i.e., is closest to the connectors 57, 58, will be referred to as "an end circuit board," and at least one circuit board, which is other than the end circuit board, will be respectively referred to as "a generic circuit board."

In the first to eighth embodiments, in which the two circuit boards are provided, the single generic circuit board 31 and the single end circuit board 33 are provided. For example, the inverter circuits, which provide the electric power to the motor windings 880, are installed at the generic circuit board 31. Components, such as a filter circuit and a communication driver, are installed at the end circuit board 33.

Figure 7B:
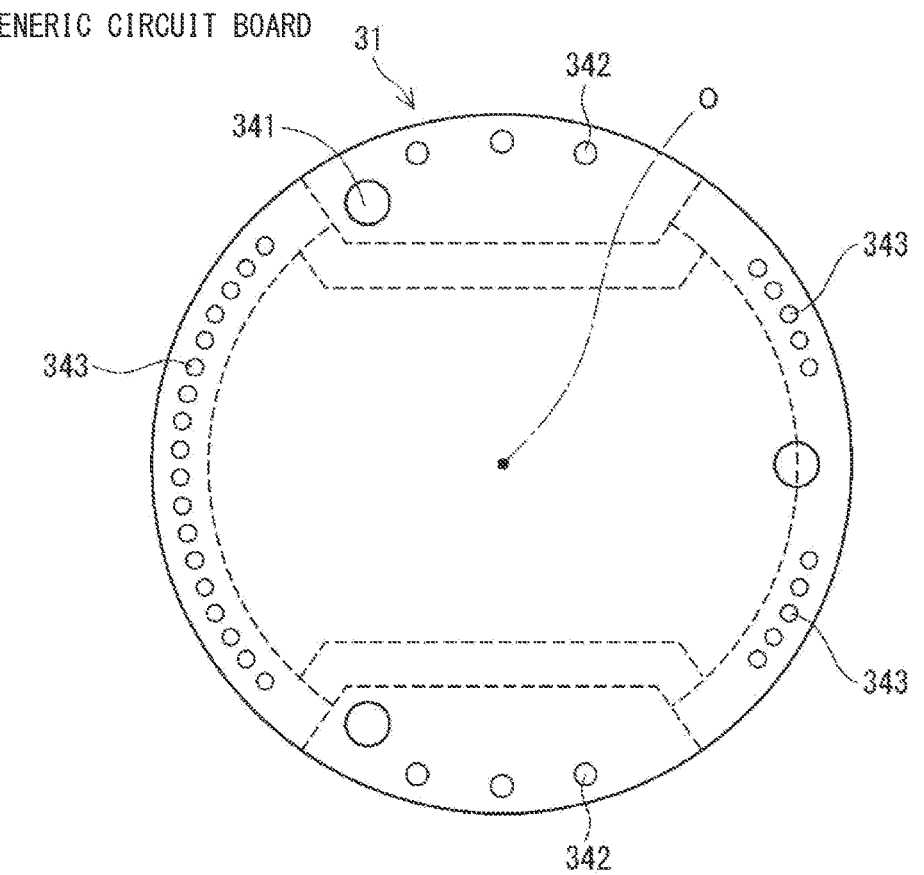
FIG. 7B is a plan view of a generic circuit board.

As shown in FIG. 7B, the generic circuit board 31 has a plurality of screw holes 341 and a plurality of motor terminal holes 342. The generic circuit board 31 is fixed to the motor frame 840 by a plurality of screws 41 respectively inserted through the screw holes 341, and a plurality of motor terminals 42, which are connected to the motor windings 880, are connected to the generic circuit board 31.

Figure 6B:
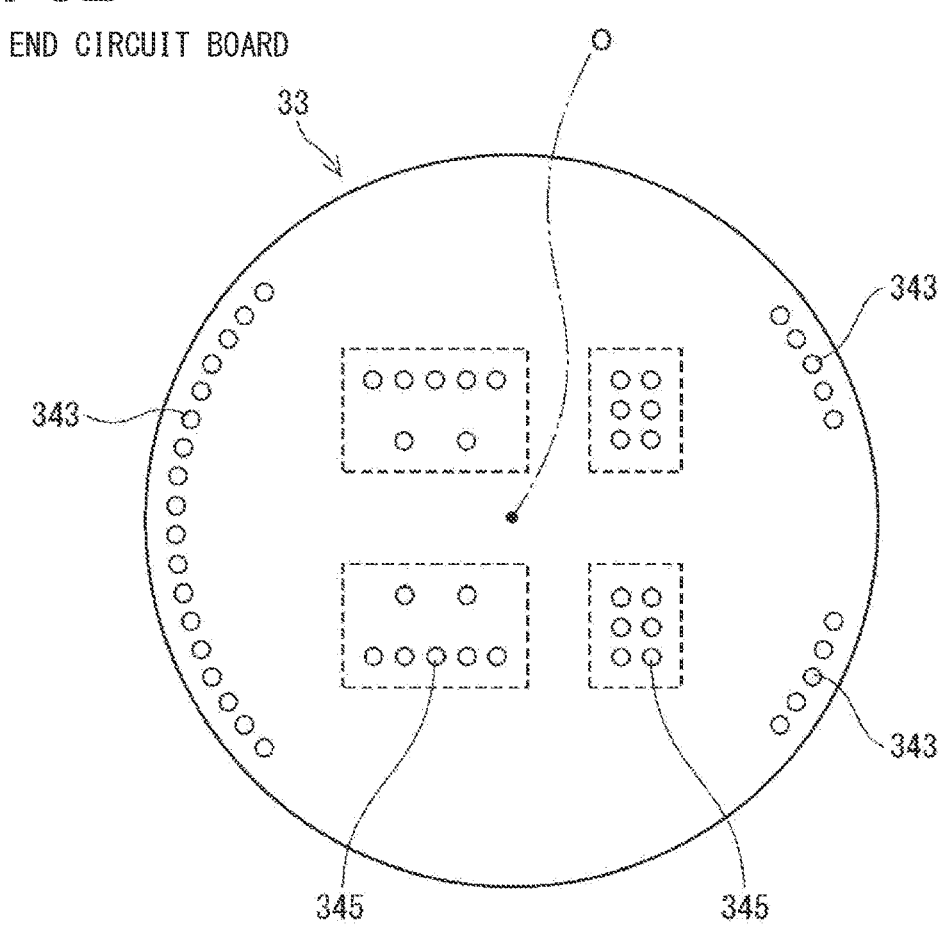
FIG. 6B is a plan view of an end circuit board.

As shown in FIGS. 6B and 7B, a plurality of inter-board terminal holes 343 are formed along an outer periphery of each of the generic circuit board 31 and the end circuit board 33. A plurality of inter-board terminals 43 are connected between the generic circuit board 31 and the end circuit board 33. FIG. 4 only shows three of the inter-board terminals 43 provided at the left side and three of the inter-board terminals 43 provided at the right side. Furthermore, as shown in FIG. 6B, a plurality of connector terminal holes 345, which correspond to the four connectors 57, 58, are formed around the center of the end circuit board 33.

Specifically, in a view taken in the axial direction of the electric motor 80, the inter-board terminals 43 are placed on a radially outer side of the connector terminals 45. Since the connectors 57, 58 are placed around the center of the top plate portion 561 of the connector housing 50, the connector terminals 45 are necessarily placed around the center of the top plate portion 561. Therefore, by placing the inter-board terminals 43 at the radially outer region, the installation space of each of the circuit boards 31, 33 can be effectively used.

Each of the connectors 57, 58 is provided with at least two connector terminals 45 among the connector terminals 45 such that one end portion of each connector terminal 45 provided to the corresponding connector 57, 58 is joined to the end circuit board 33, and another end portion of each connector terminal 45 provided to the corresponding connector 57, 58 is exposed in the mating bore of the corresponding connector 57, 58. FIG. 4 indicates five connector terminals 45 at the vehicle-system connector 57 and two connector terminals 45 at the signal-system connector 58 along a cross-section taken along line IV-IV in FIG. 3. Here, in the present embodiment, it is important that the at least two connector terminals 45 are provided to each of the connectors 57, 58, and the types of the connector terminals 45 and the number of the connector terminals 45 provided to each of the connectors 57, 58 are less important. The connector terminals 45, which are provided to the corresponding one of the connectors 57, 58, will be referred to as a group of connector terminals (hereinafter also referred to as a connector terminal group).

Figure 5A:
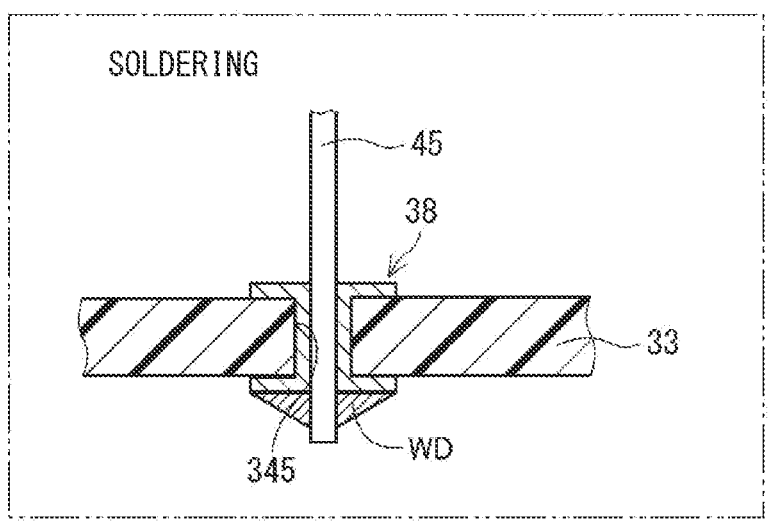
FIG. 5A is an enlarged cross-sectional view showing a connection example between a terminal and a circuit board connected by soldering.
Figure 5B:
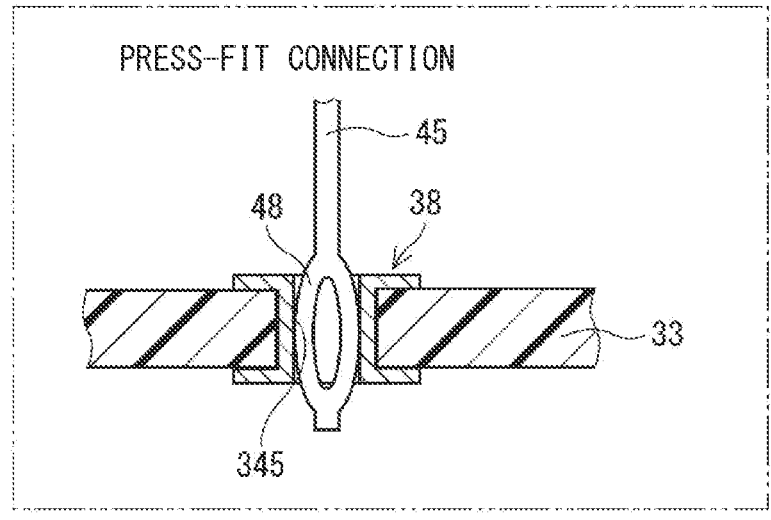
FIG. 5B is an enlarged cross-sectional view showing a connection example between a terminal and a circuit board connected by press-fitting.

FIGS. 5A and 5B respectively show an example of an electrical connection between the terminal and the circuit board while using the connection between the connector terminal 45 and the end circuit board 33 as this example. The connection between the one end portion of the inter-board terminal 43 and the generic circuit board 31 and the connection between the other end portion of the inter-board terminal 43 and the end circuit board 33 are similar to one of the connections shown in FIGS. 5A and 5B. In the following description, whenever the connection between the terminal and the circuit board is obviously the electrical connection, the word "electrical" may be omitted. A connecting portion 38, such as a via hole, is installed in the connector terminal hole 345 of the circuit board 33. The connecting portion 38 is electrically connected to an electronic component or a connecting portion of another terminal through an electric conductive pattern or a busbar.

As shown in FIG. 5A, the connector terminal 45 and the connecting portion 38 of the circuit board 33 may be soldered together by solder WD. Alternatively, as shown in FIG. 5B, a press-fit portion 48, which is resiliently deformably formed at the end portion of the connector terminal 45, may be press-fitted to the connector terminal hole 345 to form a press-fit connection.

As shown in FIG. 6A, each connector terminal binder 65, which is made of resin and corresponds to the corresponding one of the connectors 57, 58, holds an intermediate portion of each connector terminal 45 included in the corresponding connector terminal group and thereby bundles the corresponding connector terminal group together. A recess 649 may be formed at a portion of the connector terminal binder 65, which has an unnecessarily large wall thickness. The connector terminal binder 65 bundles the connector terminals 45 to ensure the relative positional accuracy of the respective connector terminals 45. The connector terminal binders 65 of the first embodiment include four separate connector terminal binders 65q1-65q4 which respectively correspond to the vehicle-system connectors 57 and the signal-system connectors 58 of the two systems. In the following description which refers to the schematic cross-sectional view, the reference sign 65 is used for the respective connector terminal binders. An installation position of the connector terminal binder 65 of the first embodiment will be described later with reference to FIG. 10.

As shown in FIGS. 7A and 8, each inter-board terminal binder 63, which is made of resin, holds an intermediate portion of each corresponding one of the inter-board terminals 43 and thereby bundles the inter-board terminals 43, which are placed adjacent to one another, together. The relative positional accuracy of the respective inter-board terminals 43 is ensured by the inter-board terminal binder 63 that bundles the inter-board terminals 43 together. Here, the inter-board terminals 43, which are placed adjacent to one another within a specific range, is defined as a group of inter-board terminals (hereinafter also referred to as an inter-board terminal group). For example, in FIGS. 6B and 7B, the inter-board terminals 43, which are arranged along a left outer peripheral region of each of the end circuit board 33 and the generic circuit board 31, form one inter-board terminal group. Furthermore, the other inter-board terminals 43, which are arranged along a right outer peripheral region of each of the end circuit board 33 and the generic circuit board 31, form another inter-board terminal group.

An inter-board terminal binder 63R of one embodiment example shown in FIG. 7A is integrally formed in one-piece in a ring form and bundles two groups of inter-board terminals 43. Two inter-board terminal binders 63A, 63B of another embodiment example shown in FIG. 8 are divided from each other circumferentially, and each of the inter-board terminal binders 63A, 63B bundles the corresponding group of inter-board terminals 43. In FIG. 9, the inter-board terminal binders 63R, 63A, 63B of the respective embodiment examples are collectively indicated by the reference sign 63. As shown in FIG. 9, the inter-board terminal binder 63 has a pin header type structure.

Referring back to FIG. 4, the connector housing 50, which is made of the resin, is shaped in the bottomed tubular form such that the outer tubular portion 562 extends toward the electric motor 80 from the outer periphery of the top plate portion 561 that is opposed to the end circuit board 33. The projection 563, which is formed at the distal end of the outer tubular portion 562, is inserted into the seal groove 843 which is shaped in the annular form and is filled with the bonding agent. When the connector housing 50 is assembled, a load bearing portion 564, which is formed at an end part of the outer tubular portion 562, contacts a frame outer periphery 844 of the motor frame 840.

As described above with reference to FIG. 3, the connectors 57, 58, which open toward the side opposite to the end circuit board 33 in the axial direction, are formed at the top plate portion 561. A bottom of the mating bore of each connector 57, 58 has a bottom hole 55. The corresponding group of connector terminals 45 bundled by the corresponding connector terminal binder 65 is insertable through the bottom hole 55 of the corresponding connector 57, 58. A periphery of the bottom hole 55 at an inner wall of the top plate portion 561 has a plate thickness that is measured in the axial direction and is smaller than a surrounding region which surrounds the periphery of the bottom hole 55. This periphery of the bottom hole 55 will be referred to as an underside zone (or a recess) 551.

FIG. 10 shows an enlarged schematic cross-sectional view of a connecting portion between the connector terminal binder 65 and the bottom hole 55 of the connector 57 used as a representative among the connectors 57, 58. The bottom portion of the connector 58 has a structure that is similar to the structure of the connector 57 described above. In the first embodiment, the connector terminal binder 65 is positioned to oppose the underside zone 551 and cover the bottom hole 55 of the corresponding connector 57 from the end circuit board 33 side. Here, the connector terminal binder 65 and the underside zone 551 may not contact with each other, and a gap may be formed between the connector terminal binder 65 and the underside zone 551. In a state where the external connectors of the cable harness are installed to the connectors 57, 58, there is no risk of water or foreign objects entering the connectors 57, 58.

Figure 11:
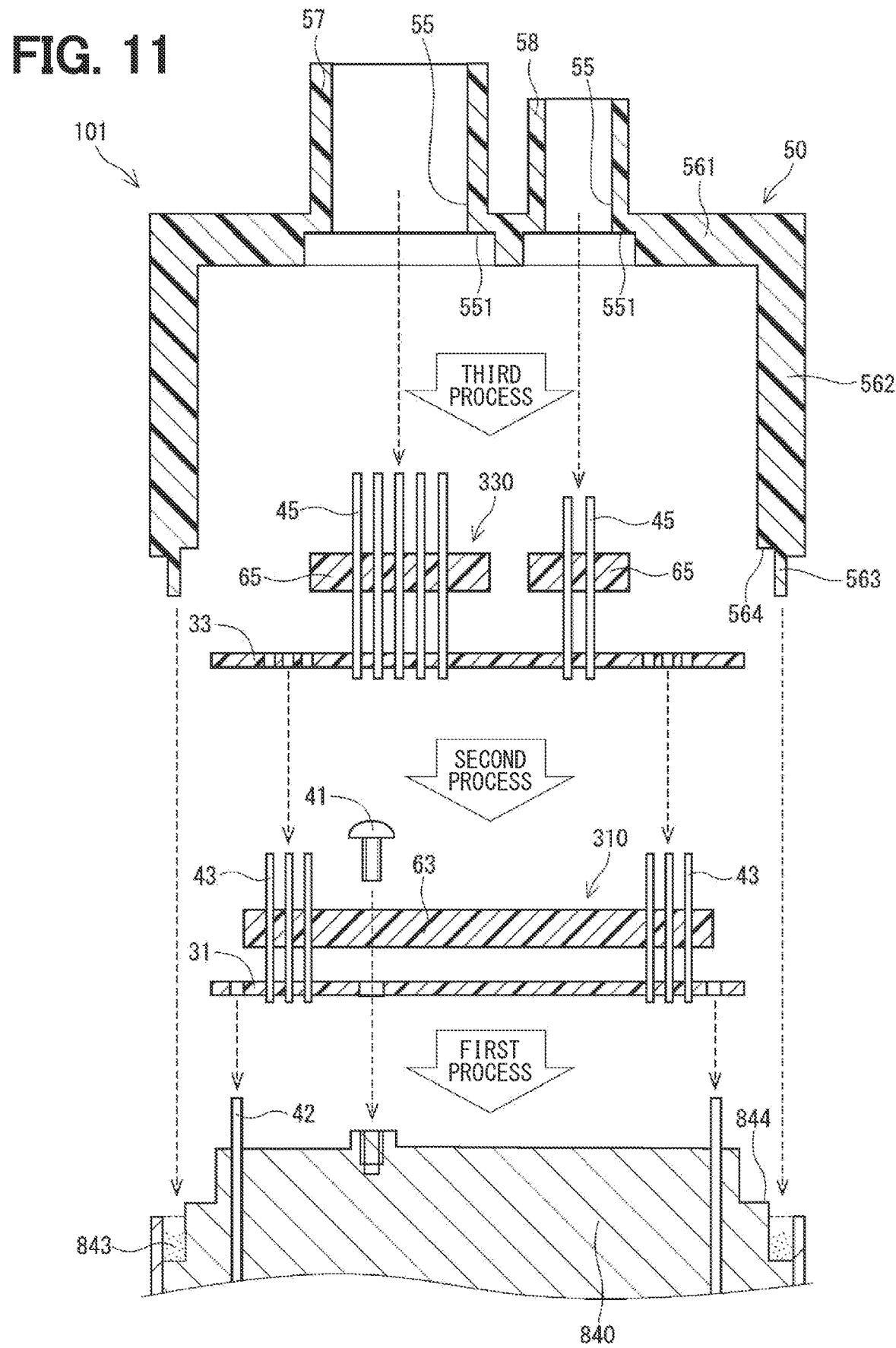
FIG. 11 is a schematic cross-sectional view for explaining an assembling method of the controller unit according to the first embodiment.
Figure 12:
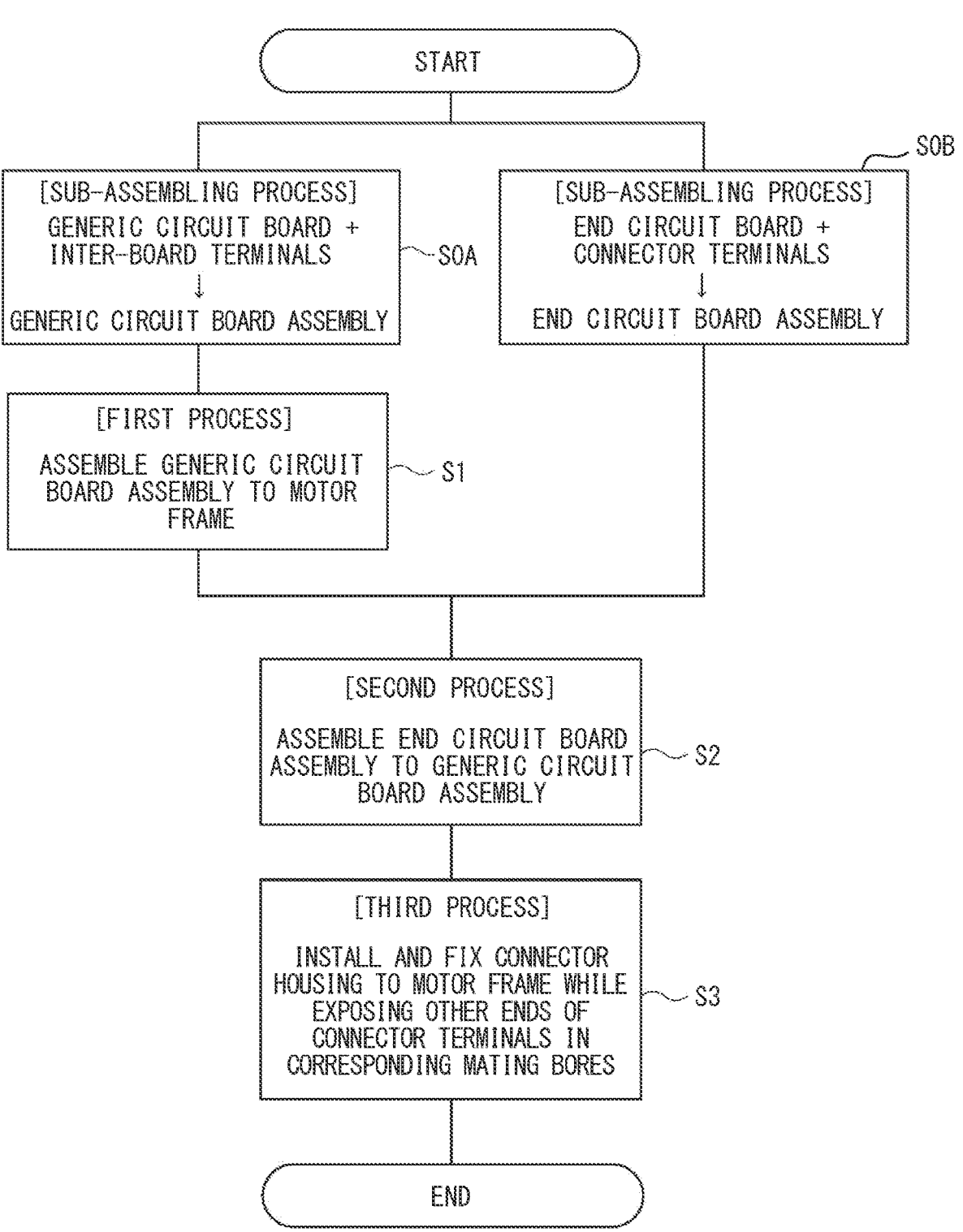
FIG. 12 is a flowchart indicating the assembling method of the controller unit according to the first embodiment.

Next, with reference to FIGS. 11 and 12, there will be described the manufacturing method of the drive device according to the first embodiment, more specifically, the assembling method of the controller unit having the two-board structure (i.e., the structure having the two circuit boards) according to the first embodiment. In the flowchart of FIG. 12, the sign "S" stands for "step" or "process." This assembling method includes: a sub-assembling process, which is carried out in advance at another assembling line; and a first process, a second process and a third process, which are carried out at the present assembling line. In the following description, the "operator" who is the subject of the assembly work is not limited to a human, and may be a robot.

Here, the assembling flow of the controller unit 101 having the two-board structure, in which the generic circuit board 31 and the end circuit board 33 are connected together by the inter-board terminals 43, will be described as a basic flow. In contrast to the basic flow, a modification, in which inter-board connectors (also referred to as inter-board connecting components) are used in place of the inter-board terminals 43, will be described later in an eighth embodiment. Furthermore, another modification, in which three or more circuit boards are used, will be described later in the other embodiments.

In the sub-assembling process S0A, one end portion of each of the inter-board terminals 43 is connected to the generic circuit board 31. A semi-finished product in this state is defined as a generic circuit board assembly 310. In the sub-assembling process S0B, one end portion of each of the connector terminals 45 bundled by the corresponding connector terminal binder 65, is connected to the end circuit board 33. A semi-finished product in this state is defined as an end circuit board assembly 330.

In the controller unit 101 having the two-board structure, the generic circuit board assembly (i.e., a single generic circuit board assembly) 310 and the end circuit board assembly (i.e., a single end circuit board assembly) 330 are prepared. The generic circuit board assembly 310 is a lowest generic circuit board assembly which is closest to the motor frame 840 and is also a highest generic circuit board assembly placed immediately below the end circuit board 33.

In the first process S1, the operator assembles the generic circuit board assembly 310 to the motor frame 840. At this time, the motor terminals 42 are inserted into and are electrically connected to the motor terminal holes 342 of the generic circuit board 31. The generic circuit board assembly 310 is fixed to the motor frame 840 by the screws 41.

After the first process S1, in the second process S2, the operator assembles the end circuit board assembly 330 to the generic circuit board assembly 310. At this time, the other end portion of each of the inter-board terminals 43 is inserted into and is electrically connected to the corresponding one of the inter-board terminal holes 343 of the end circuit board 33. The first process S1 and the second process S2 can be performed using a jig or similar tool while viewing connecting points in an open space.

In the third process S3 after the second process S2, the operator exposes the other end portion of each of the connector terminals 45 of the end circuit board assembly 330 in the mating bore of the corresponding one of the connectors 57, 58 and places the connector housing 50 to cover the end circuit board assembly 330 and the generic circuit board assembly 310 with the connector housing 50. Then, the projection 563 of the connector housing 50 is inserted into the seal groove 843 filled with the bonding agent, and the outer tubular portion 562 is fixed to the motor frame 840. Since the motor frame 840 is fixed to the electric motor 80, it may be said that the outer tubular portion 562 is fixed to the electric motor 80. The third process S3 becomes a blind connection assembly process where each of the connecting portions is shaded by the connector housing 50 and thereby become a blind spot (invisible spot).

In the first embodiment, each group of connector terminals 45, which corresponds to the corresponding one of the connectors 57, 58, is bundled by the corresponding connector terminal binder 65, and a press-fit load per terminal is not generated. Furthermore, each of the connector terminal binders 65 is only placed such that the connector terminal binder 65 is placed at the location where the connector terminal binder 65 is opposed to the corresponding underside zone 551 of the connector housing 50 and covers the bottom hole 55 of the corresponding connector 57, 58 from the end circuit board 33 side. Therefore, the connector terminal binder 65 does not even generate a contact load.

As discussed above, in the first embodiment, the third process S3 is carried out such that the load, which is generated when the other end portion of each of the connector terminals 45 is exposed in the mating bore of the corresponding one of the connectors 57, 58 in the third process, is smaller than the load, which is generated in the first process, and the load, which is generated in the second process.

Now, with reference to FIGS. 13 and 14, a disadvantage of an assembling method of a controller unit of each of a comparative example 1 and a comparative example 2, which are contrasted with the first embodiment, will be described. In the description of the structures of the comparative example 1 and the comparative example 2, the terms used in the first embodiment will be used as appropriate. In comparison to the generic circuit board assembly 310 of the first embodiment, the comparative example 1 and the comparative example 2 use a generic circuit board assembly 319, in which one end portion of each of the inter-board terminals 43 is individually connected to the generic circuit board 31, and the inter-board terminal binder 63 is not provided at all.

Figure 13:
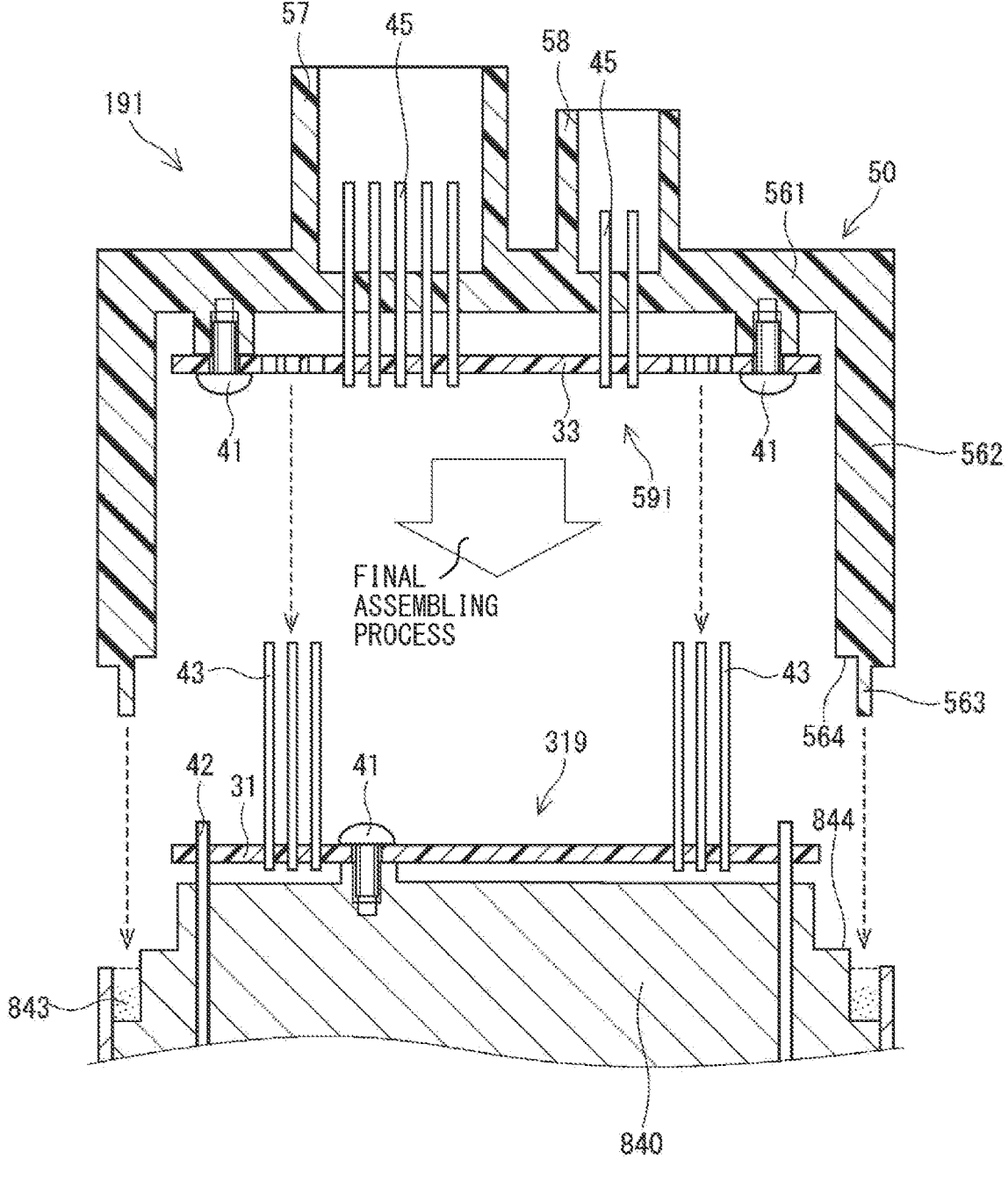
FIG. 13 is a schematic cross-sectional view for explaining a disadvantage of an assembling method of a controller unit according to a comparative example 1.

FIG. 13 shows the structure of the controller unit 191 of the comparative example 1. First of all, the generic circuit board assembly 319, which does not have the inter-board terminal binder 63, is assembled to the motor frame 840. Furthermore, the end circuit board 33, to which the connector terminals 45 are connected, is fixed at the inside of the connector housing 50 by the screws 41 to form a connector housing assembly 591. In a final assembling process, which becomes the blind connection assembly process, the other end portions of the inter-board terminals 43 of the generic circuit board assembly 319 are connected to the end circuit board 33 of the connector housing assembly 591. Here, it should be noted that the inter-board connector of, for example, the eighth embodiment, may be used in place of the inter-board terminals 43.

As shown in, for example, FIG. 6B, the number of the inter-board terminals 43 is relatively large. The load, which is generated at the time of assembling, is generally proportional to the number of connection terminals (i.e., the number of the terminals to be connected). Therefore, when the number of connection terminals is increased, the total load is increased. Furthermore, the end circuit board 33, which is assembled to the connector housing 50 made of the resin, has a relatively low positional accuracy at a fitting location thereof. Therefore, even when a guide mechanism is provided, an assembling load (a load generated at the time of assembling) applied to the end circuit board 33 is likely to be high. Even if the generic circuit board assembly 310, which includes the inter-board terminal binder 63, is used, the disadvantage, which is similar to the above-described one, may be encountered.

In contrast to the comparative example 1, in the first embodiment, in the third process S3, which the final assembling process and becomes the blind connection assembly process, each of the connector terminal binders 65 is merely opposed to the corresponding underside zone 551 of the connector housing 50. Therefore, the assembling load can be kept low. Furthermore, even in a case, such as the seventh embodiment described later, where each of the connector terminals 45 is inserted through a corresponding one of a plurality of terminal insertion holes 54, the number of the connection terminals at the final assembling process is smaller than the number of the inter-board terminals 43, and thereby, the load can be reduced. Furthermore, in the first embodiment, since the generic circuit board assembly 310 and the end circuit board assembly 330 are sequentially assembled to the motor frame 840 made of the metal, the positional accuracy in the final assembling process is improved. Therefore, a load, which is caused by correcting the positional deviation, is not generated.

Figure 14:
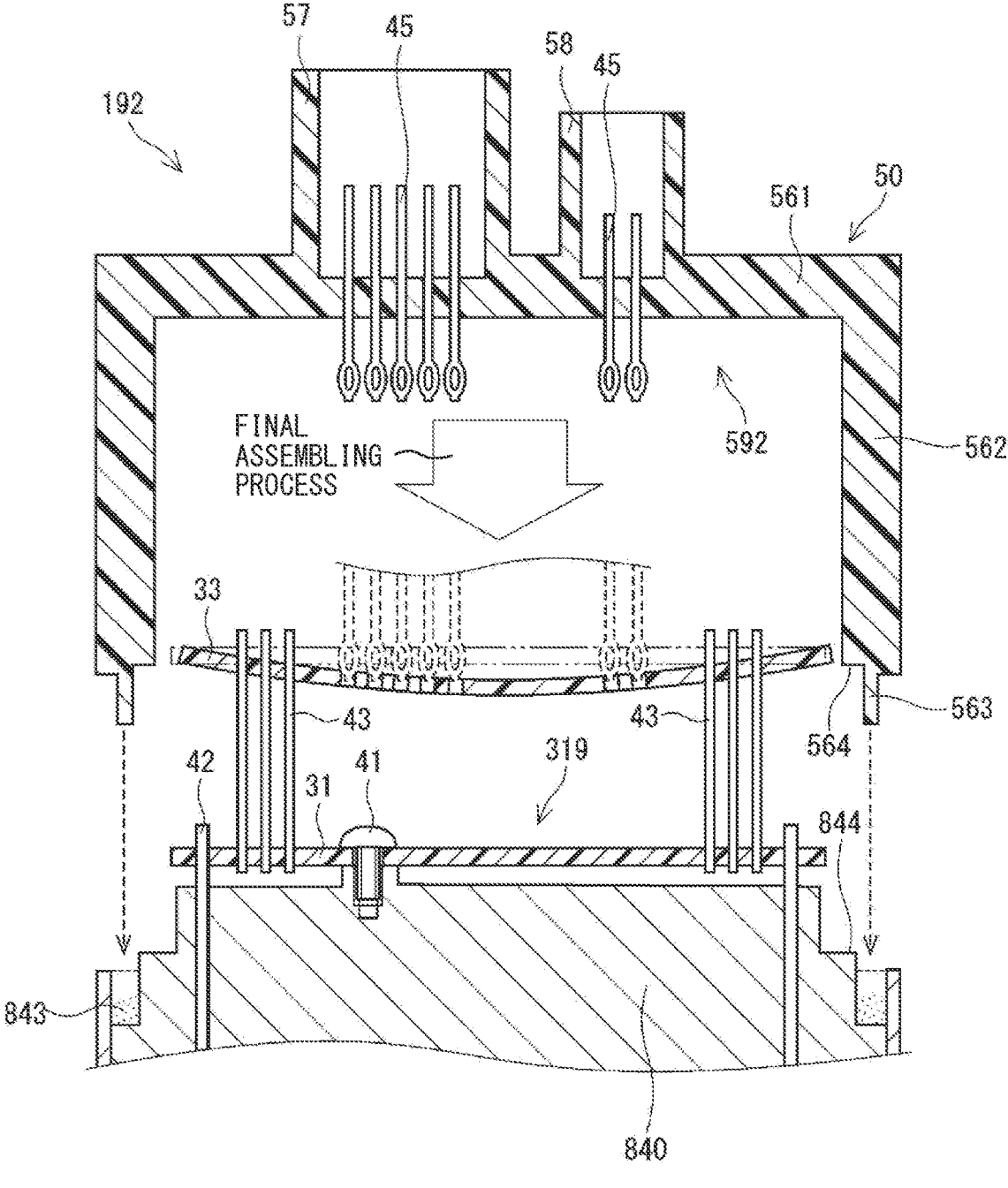
FIG. 14 is a schematic cross-sectional view for explaining a disadvantage of an assembling method of a controller unit according to a comparative example 2.

A controller unit 192 of the comparative example 2 shown in FIG. 14 is a controller unit that uses the two-board structure of the previously proposed technique. After the generic circuit board assembly 319, which does not include the inter-board terminal binder 63, is assembled to the motor frame 840, the single end circuit board 33 is assembled to the generic circuit board assembly 319.

Furthermore, the connector terminals 45 are insert-molded or outsert-molded to the connector housing 50 at a center region of the top plate portion 561 to form a connector housing assembly 592. The connector terminal binder 65 is not provided. The end portion of each of the connector terminals 45, which faces the end circuit board 33, is shaped in a form of press-fit type which is resiliently deformably formed.

In the comparative example 2, in the final assembling process, which becomes the blind connection assembly process, the connector terminals 45 of the connector housing assembly 592 are press-fitted to and are thereby connected to the end circuit board 33. At this time, a press-fit load is applied to a center portion of the end circuit board 33 which has no support immediately below it. Therefore, there is a risk that the end circuit board 33 may flex. Even if the generic circuit board assembly 310, which includes the inter-board terminal binder 63, is used, the disadvantage, which is similar to the above-described one, may be encountered.

Furthermore, not only in the structure of the comparative example 2, in which the connector terminals 45 are insert-molded or outsert-molded to the connector housing 50, the end circuit board 33 may flex in the same way if the insertion load of the connector terminals 45 in the final assembling process is high. For example, in the third process of the first embodiment, in a case where the end circuit board assembly 330 is fitted to the connector housing 50 by press-fitting, the load, which is generated in the third process, may become larger than the load generated in the first process and the load generated in the second process to possibly cause the flexure of the end circuit board 33.

There is an idea of mechanically strengthen the final assembly portion to limit the flexure of the end circuit board 33. However, if a structure for increasing the strength occupies more space, the meaning of securing the mounting area by adopting the two-board structure is lost. Therefore, it is required to establish the assembling with the low load without the additional structure.

In view of this point, in the first embodiment, the third process S3 is carried out such that the load, which is generated when the other end portion of each of the connector terminals 45 is exposed in the mating bore of the corresponding one of the connectors 57, 58 in the third process, is smaller than the load, which is generated in the first process, and the load, which is generated in the second process. Therefore, the flexure of the end circuit board 33, which is caused by the assembling load of the connector terminals 45, is limited at the time of manufacturing the drive device having the two-board structure.

Next, with reference to FIGS. 15A to 16B, the manufacturing method of the drive device, which is improved for efficiently carrying out the blindly connection assembly of the third process, will be described. In this manufacturing method, the operator carries out the assembling operation while lifting the end circuit board assembly 330 toward the connector housing 50 by using a hook jig HK that has a distal end portion shaped in a hook form. There will be described two embodiment examples, which provide two structure patterns of a hook engaging portion configured to be engaged with the hook jig HK.

Figure 15A:
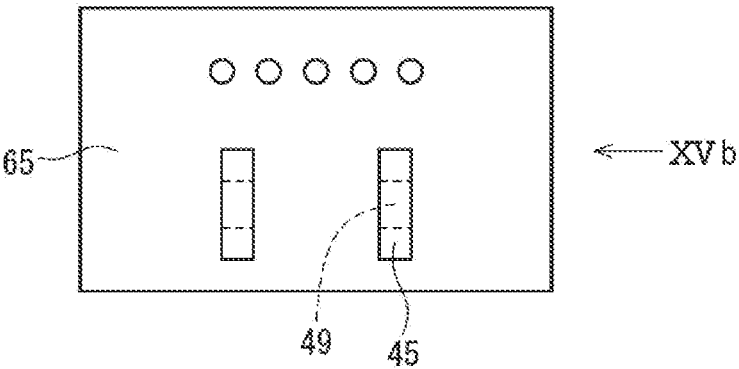
FIG. 15A is a plan view of a connector terminal binder for explaining an embodiment example 1 of a manufacturing method using a hook jig.
Figure 15B:
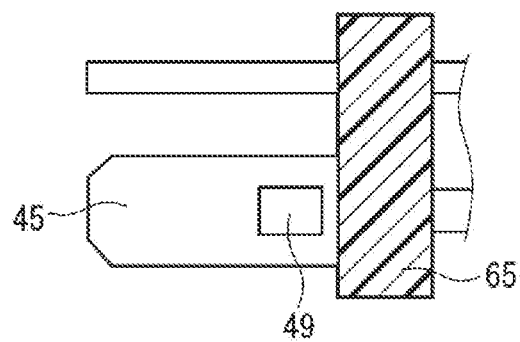
FIG. 15B is a side view of a connector terminal for explaining the embodiment example 1 of the manufacturing method using the hook jig.

In the embodiment example 1, as shown in FIGS. 15A and 15B, a hook hole 49, which serves as the hook engaging portion, is formed at a base portion of the connector terminal 45 (serving as, for example, the electric power supply terminal) which is held by the connector terminal binder 65. The hook hole 49 is formed at a location that does not affect the electric current conduction and avoids a mating area to be connected with the cable harness.

Figure 15C:
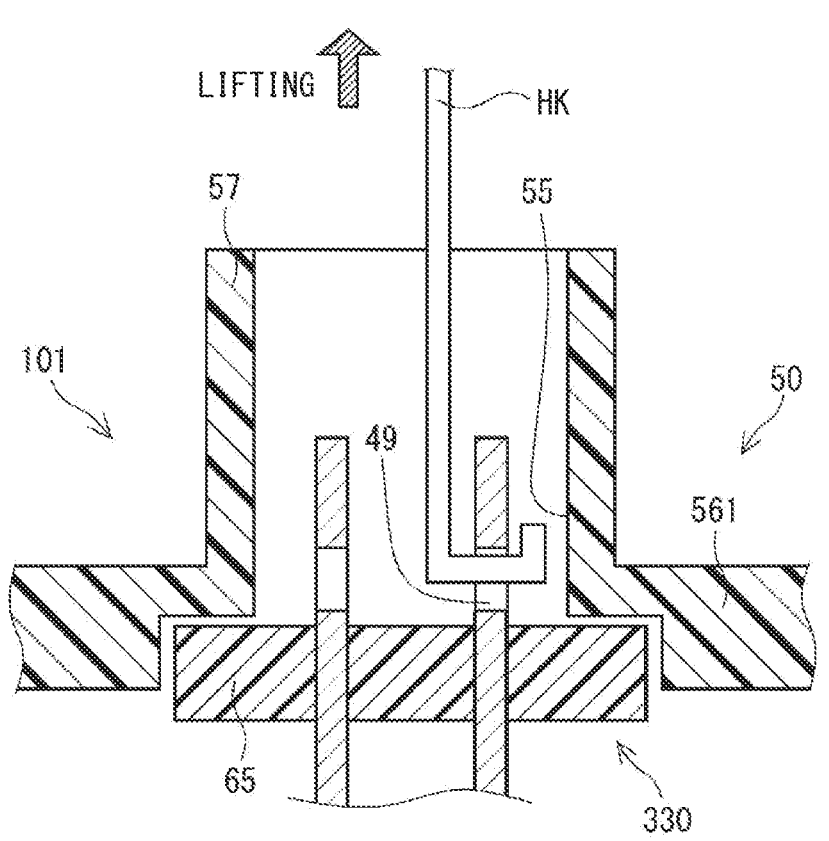
FIG. 15C is an enlarged schematic cross-sectional view of a connector bottom portion for explaining the embodiment example 1 of the manufacturing method using the hook jig.

As shown in FIG. 15C, in the third process, at the inside of the bottom hole 55 of the connector 57, the hook jig HK is engaged with the hook hole 49 of the connector terminal 45. The operator carries out the assembling operation while lifting the end circuit board assembly 330 toward the connector housing 50 by using the hook jig HK. This can limit a push-down load, which is applied to the end circuit board 33 at the time of assembling the connector housing 50.

Figure 16A:
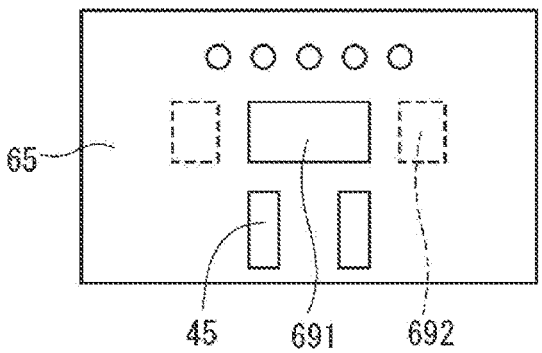
FIG. 16A is a plan view of a connector terminal binder for explaining an embodiment example 2 of a manufacturing method using a hook jig.

In the second embodiment example, as shown in FIG. 16A, a through-hole 691 extends through an intermediate portion of the connector terminal binder 65 in a thickness direction of the connector terminal binder 65. Furthermore, a relief groove 692, which can receive the hook portion of the hook jig HK, is formed at a lower surface of the connector terminal binder 65. The through-hole 691 and the relief groove 692 form the hook engaging portion. In place of the relief groove, a stepped portion or a sloped portion may be formed. Also, the relief groove or the like may be eliminated depending on a shape and a size of the hook portion.

Figure 16B:
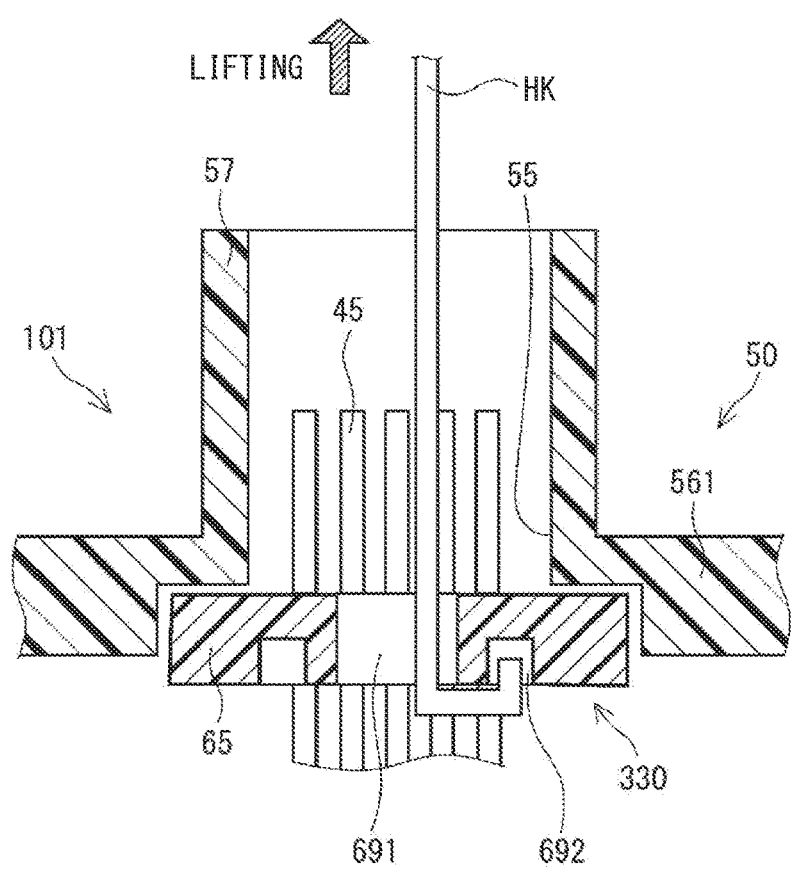
FIG. 16B is an enlarged schematic cross-sectional view of a connector bottom portion for explaining the embodiment example 2 of the manufacturing method using the hook jig.

As shown in FIG. 16B, in the third process, at the inside of the bottom hole 55 of the connector 57, the hook jig HK is engaged with the through-hole 691 and the relief groove 692 of the connector terminal binder 65. The operator carries out the assembling operation while lifting the end circuit board assembly 330 toward the connector housing 50 by using the hook jig HK. This can limit the push-down load, which is applied to the end circuit board 33 at the time of assembling the connector housing 50.

Next, the second to fifth embodiments, which show other structures for assembling the connector terminal binder 65 to the bottom hole 55 of the connector 57, 58, will be described with reference to bottom portion cross-sectional views of the connector 57 which corresponds to FIG. 10. In all of these embodiments, the assembling load in the third process can be reduced.

Second Embodiment

Figure 17:
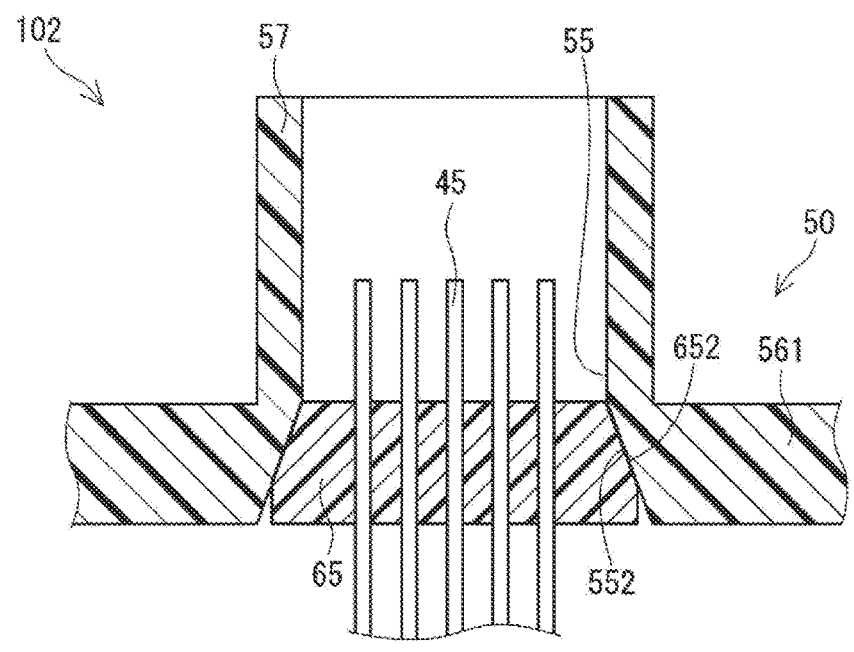
FIG. 17 is an enlarged schematic cross-sectional view of a connector bottom portion according to a second embodiment.

In a controller unit 102 of the second embodiment shown in FIG. 17, the connector terminal binder 65 is fitted to the bottom hole 55 of the connector 57. Specifically, the connector terminal binder 65 is fitted to the bottom hole 55 of the connector 57 such that a sloped surface 652 and a sloped surface 552, which are formed at an outer peripheral surface of the connector terminal binder 65 and an inner peripheral surface of the bottom hole 55, respectively, contact with each other. With this structure, the connector terminal binder 65 can be positioned relative to the bottom hole 55.

Third Embodiment

Figure 18:
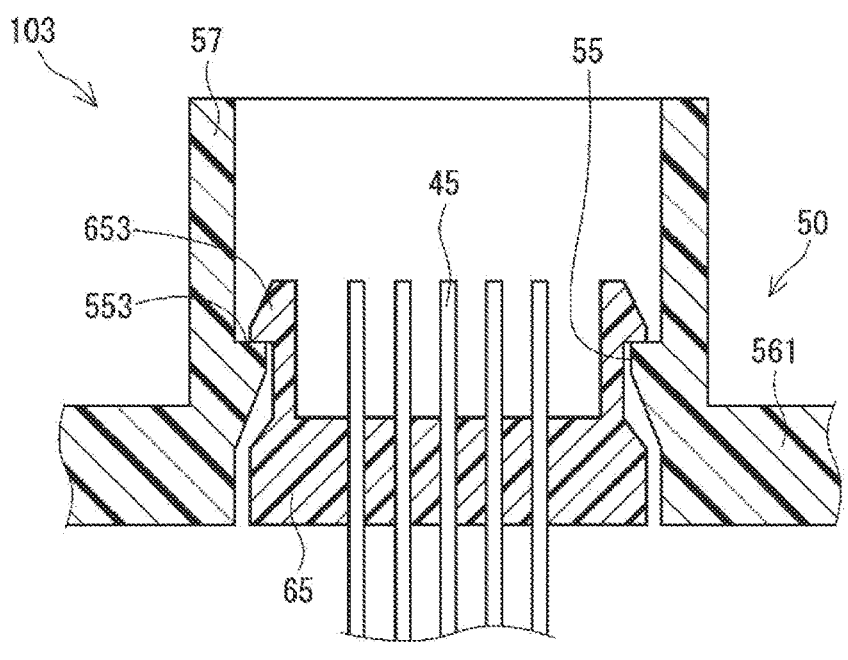
FIG. 18 is an enlarged schematic cross-sectional view of a connector bottom portion according to a third embodiment.

In a controller unit 103 of the third embodiment shown in FIG. 18, the connector terminal binder 65 is fitted to the bottom hole 55 of the connector 57 through resilient deformation of the connector terminal binder 65, i.e., press-fitting of the connector terminal binder 65. Specifically, claws 653, which are formed at the connector terminal binder 65, pass through an inner wall of the bottom hole 55 while resiliently deforming inward. After passing through the inner wall of the bottom hole 55, the claws 653 are anchored to a receiving portion 553 which is formed around the bottom hole 55. For example, the claws 653 are respectively provided to two sides, which are opposed to each other, among four sides of the connector terminal binder 65.

Fourth Embodiment

Figure 19A:
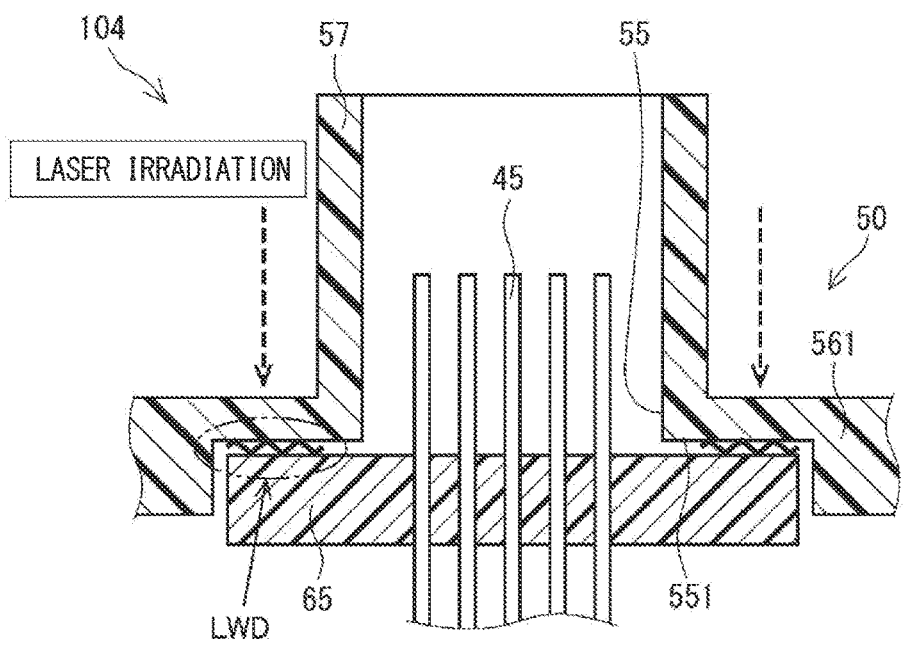
FIG. 19A is an enlarged schematic cross-sectional view of a connector bottom portion according to a fourth embodiment.

FIG. 19A shows a controller unit 104 of the fourth embodiment. After the connector housing 50 is assembled in the same manner as in the first embodiment, a laser beam is irradiated along a circumference around the outer wall of the connector 57 at the top plate portion 561 toward an overlapping portion at which the underside zone 551 and the connector terminal binder 65 overlap each other. Here, at least the area where the laser beam is irradiated is made of a laser-transparent resin material. The overlapping portion, at which the underside zone 551 and the connector terminal binder 65 overlap each other, becomes a joint portion LWD by the laser irradiation. The laser irradiation method of FIG. 19A can be applied to a case where the connector terminals 45 are in close proximity to the inner wall of the connector 57 and to a case where a depth of the connector 57 is relatively deep.

Figure 19B:
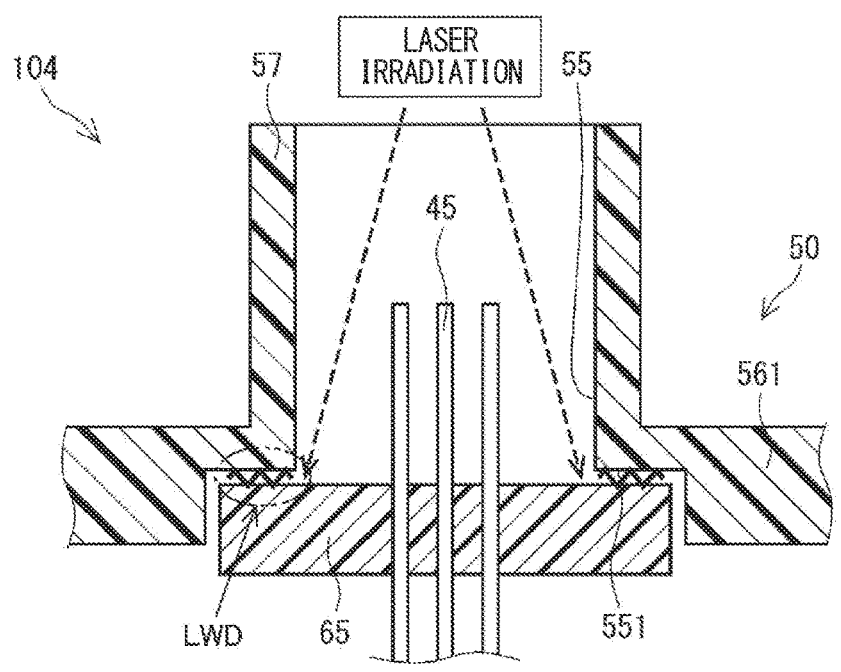
FIG. 19B is an enlarged schematic cross-sectional view of a connector bottom portion according to a modification of the fourth embodiment.

A modification of the fourth embodiment shown in FIG. 19B can be applied to a case where a distance between the inner wall of the connector 57 and the connector terminals 45 is relatively large, and the depth of the connector 57 is relatively shallow while avoiding interference between the laser beam and the connector terminals 45. In this modification, the laser beam is obliquely irradiated from the inside of the mating bore of the connector 57 toward a boundary between a peripheral edge of the bottom hole 55 and the connector terminal binder 65. A portion along the peripheral edge of the bottom hole 55 becomes the joint portion LWD.

In the fourth embodiment, in a state where the cable harness is unplugged, a performance for limiting the intrusion of water and foreign objects is improved by joining the underside zone 551 of the connector housing 50 and the connector terminal binder 65 together.

Fifth Embodiment

Figure 20:
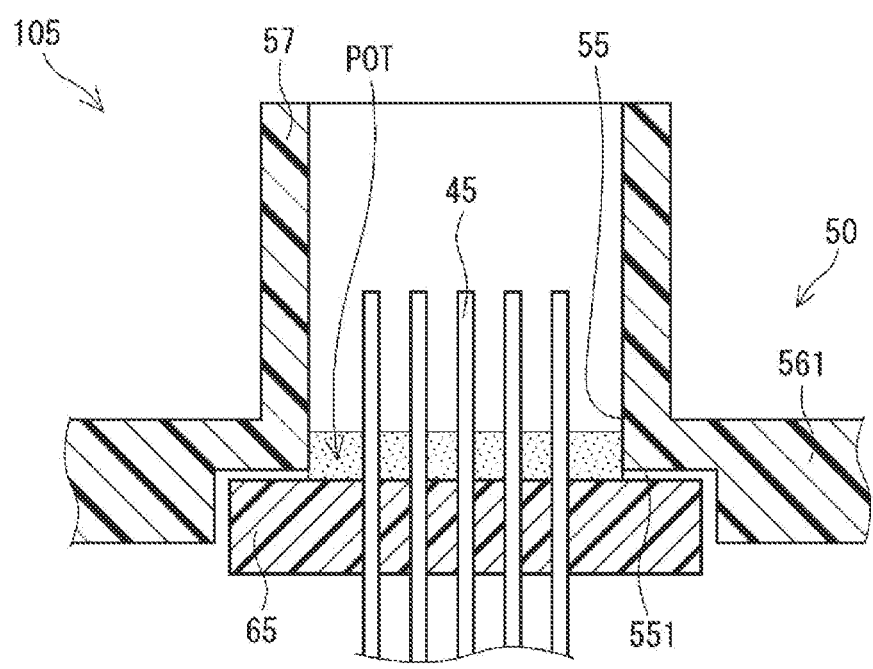
FIG. 20 is an enlarged schematic cross-sectional view of a connector bottom portion according to a fifth embodiment.

In a controller unit 105 of the fifth embodiment shown in FIG. 20, the connector housing 50 having a structure similar to that of the first embodiment is assembled, and thereafter, a potting material POT is filled from the mating bore of the connector 57 into the bottom hole 55. The potting material POT is filled such that the potting material POT fills a gap between the underside zone 551 of the connector housing 50 and the connector terminal binder 65. In this way, like in the fourth embodiment, the performance for limiting the intrusion of the water and the foreign objects is improved in the state where the cable harness is unplugged.

Sixth Embodiment

Figure 21:
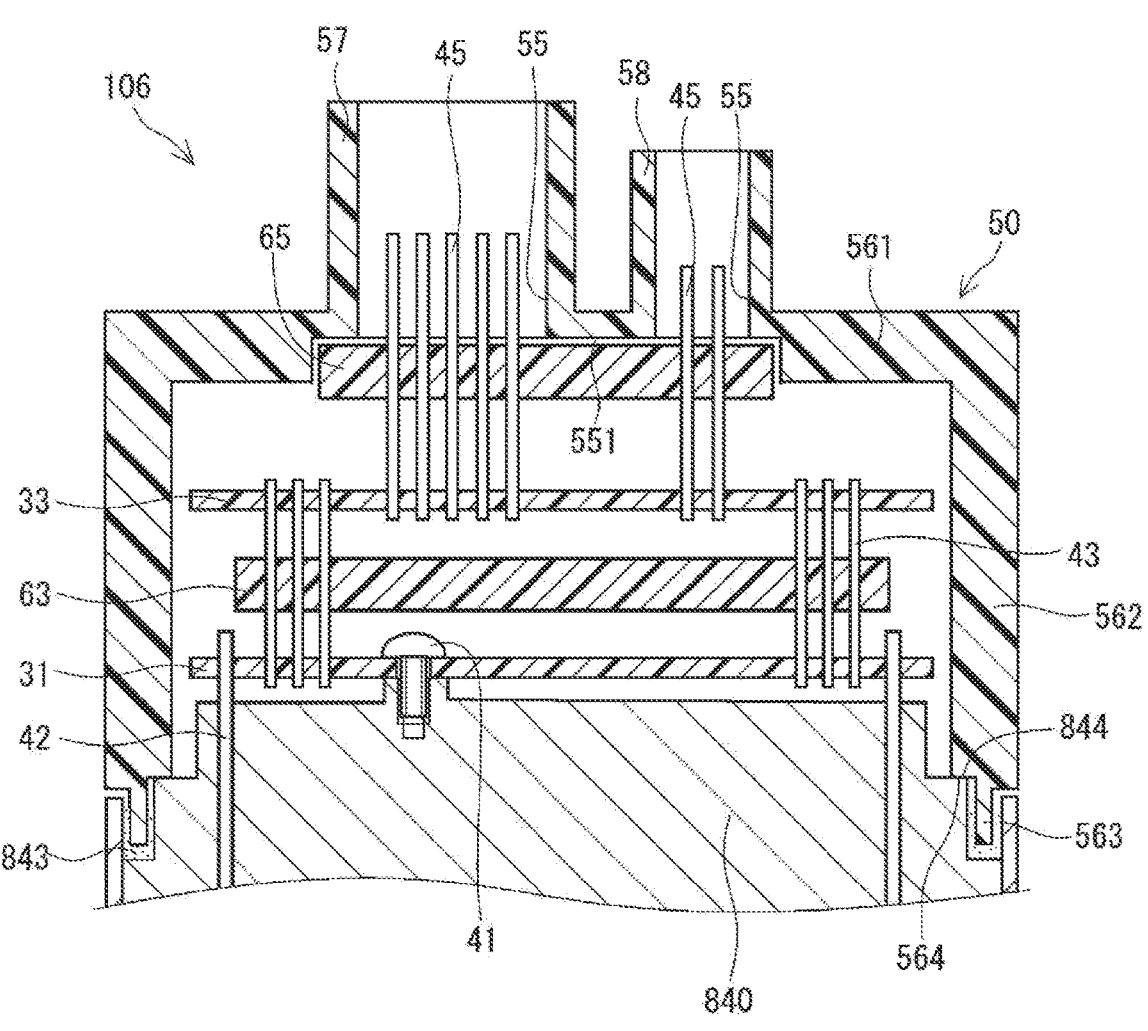
FIG. 21 is a schematic cross-sectional view of a controller unit according to a sixth embodiment.
Figure 22A:
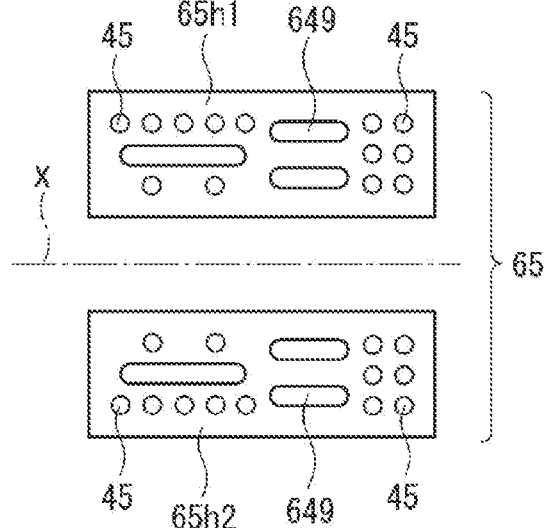
FIG. 22A is a plan view of connector terminal binders of a two-group coupling type each of which collectively bundles a plurality of connector terminal groups that respectively correspond to a plurality of connectors.
Figure 22B:
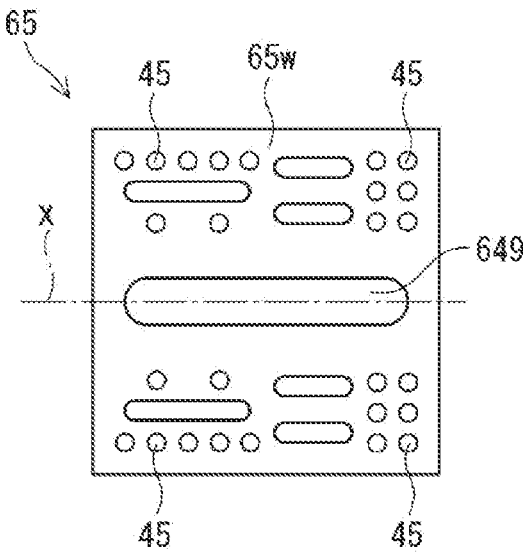
FIG. 22B is a plan view of a connector terminal binder of a four-group coupling type which collectively bundles a plurality of connector terminal groups that respectively correspond to a plurality of connectors.

In a controller unit 106 of the sixth embodiment shown in FIGS. 21, 22A and 22B, the connector terminal binder(s) 65 commonly bundles the adjacent groups of connector terminals 45 which correspond to the connectors 57, 58 placed adjacent to each other. In contrast to the connector terminal binders 65 of the first embodiment shown in FIG. 6A, the connector terminal binders 65 shown in FIG. 22A include two connector terminal binders 65h1, 65h2 of a two-group coupling type (i.e., a connector terminal binder configured to bundle two groups of connector terminals 45). Each of the connector terminal binders 65h1, 65h2 of the two-group coupling type, which are respectively provided to the two systems, bundles a plurality of groups (more specifically, two groups) of connector terminals 45 that respectively correspond to the vehicle-system connector 57 and the signal-system connector 58 placed adjacent to each other. The connector terminal binder 65 shown in FIG. 22B is a connector terminal binder 65w of a four-group coupling type (i.e., a connector terminal binder configured to bundle four groups of connector terminals 45). The connector terminal binder 65w of the four-group coupling type commonly bundles the plurality of groups (more specifically, four groups) of the connector terminals 45 that correspond to all of the connectors 57, 58.

In the sixth embodiment, the number of the connector terminal binders 65 can be reduced in comparison to that of the first embodiment. The sixth embodiment is advantageous in, for example, a case where the connector housing 50 is relatively small, and a change in a size of the mating bore of each connector 57, 58 caused by the temperature characteristics is relatively small. The laser irradiation of the fourth embodiment and/or the potting of the fifth embodiment may be combined with the structure of the connector terminal binder(s) 65 of the sixth embodiment.

Seventh Embodiment

Figure 23:
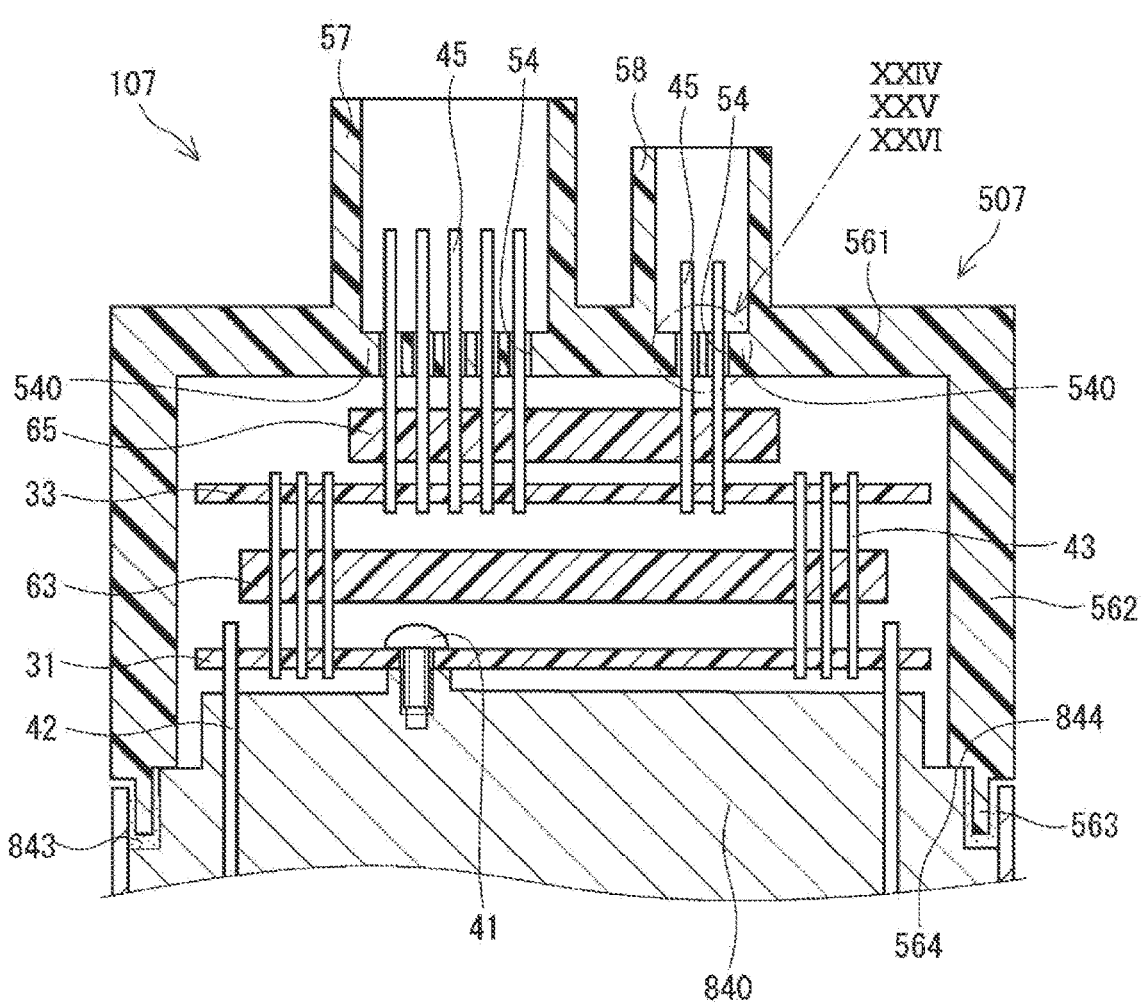
FIG. 23 is a schematic cross-sectional view of a controller unit according to a seventh embodiment.

Next, a structure of a controller unit 107 of the seventh embodiment will be described with reference to FIGS. 23 to 26. FIG. 23 shows an overall structure of the controller unit 107. In the connector housing 50 of the first to sixth embodiments, the bottom hole 55 opens at the bottom of the mating bore of each connector 57, 58. In contrast, at the connector housing 507 of the seventh embodiment, a bottom plate portion 540, which is continuous from the top plate portion 561, forms the bottom of the mating bore of the connector 57, 58. A plurality of terminal insertion holes 54, through which the connector terminals 45 can be respectively inserted, are formed at the bottom plate portion 540. One end portion of each connector terminal 45 is connected to the end circuit board 33, and the other end portion of each connector terminal 45 is inserted through the corresponding terminal insertion hole 54 and is exposed in the mating bore of the corresponding connector 57, 58.

Each connector terminal binder 65 is placed between the connector housing 50 and the end circuit board 33 and is spaced from the connector housing 50. The example shown in FIG. 23 uses the connector terminal binders 65 of the two-group coupling type or the connector terminal binder 65 of the four-group coupling type according to the sixth embodiment. Each connector terminal binder 65 holds the intermediate portion of each connector terminal 45 of each of the corresponding connector terminal groups, which respectively correspond to the adjacent connectors 57, 58, to bundle the corresponding connector terminal groups together.

Figure 24:
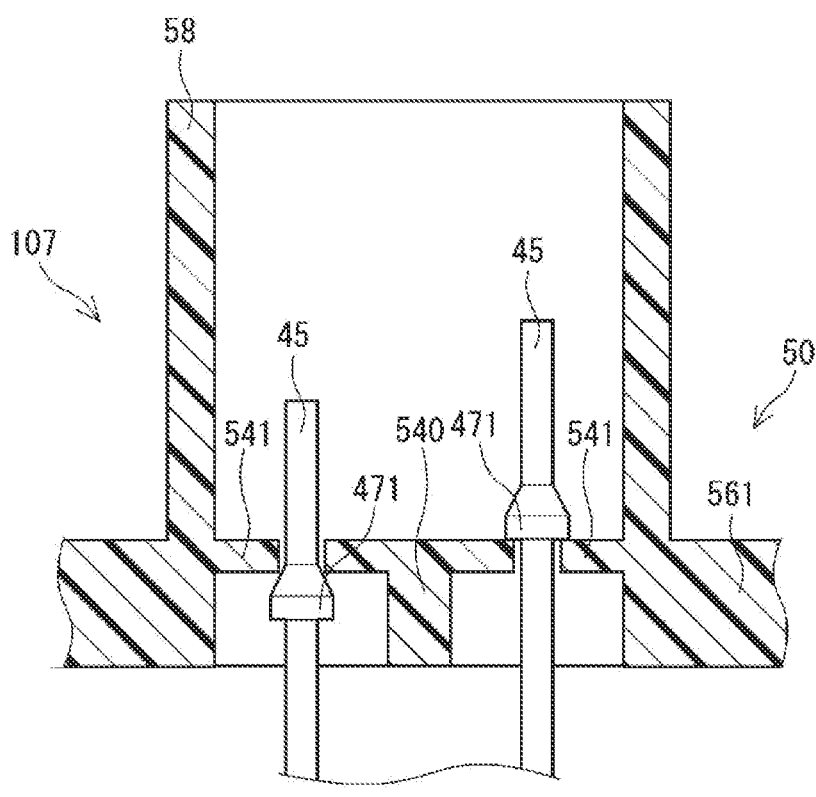
FIG. 24 is an enlarged schematic cross-sectional view of a connector bottom portion according to an embodiment example 1 of the seventh embodiment.
Figure 25:
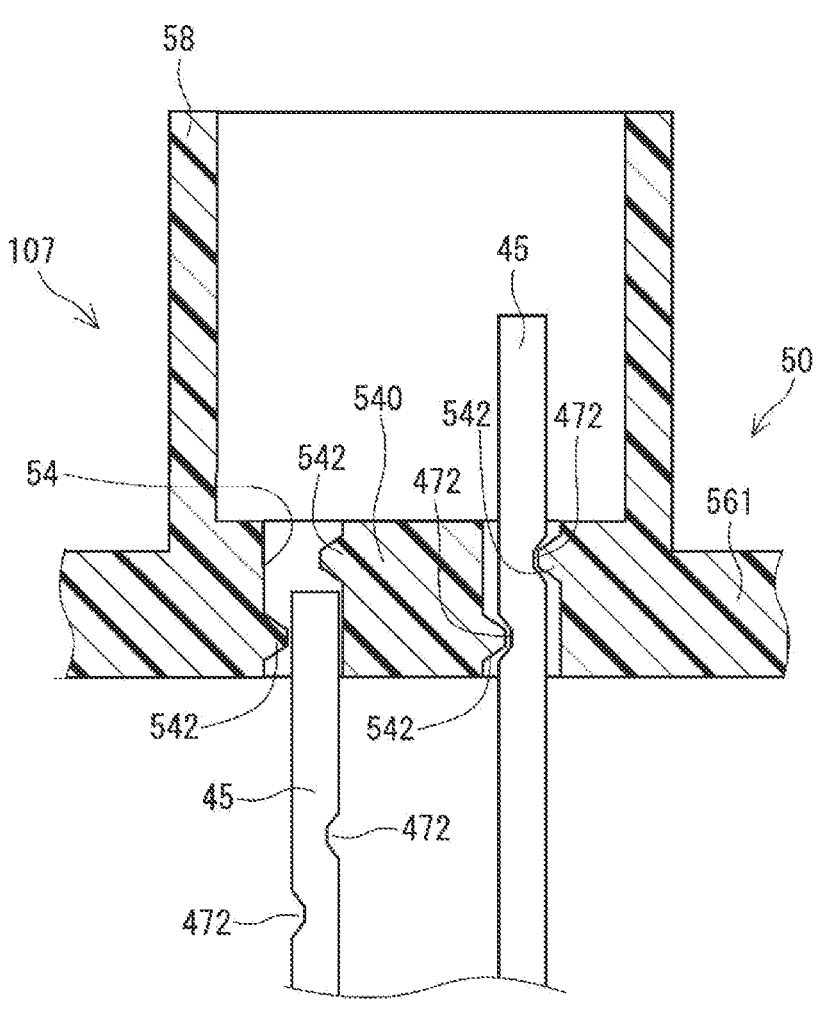
FIG. 25 is an enlarged schematic cross-sectional view of a connector bottom portion according to an embodiment example 2 of the seventh embodiment.
Figure 26:
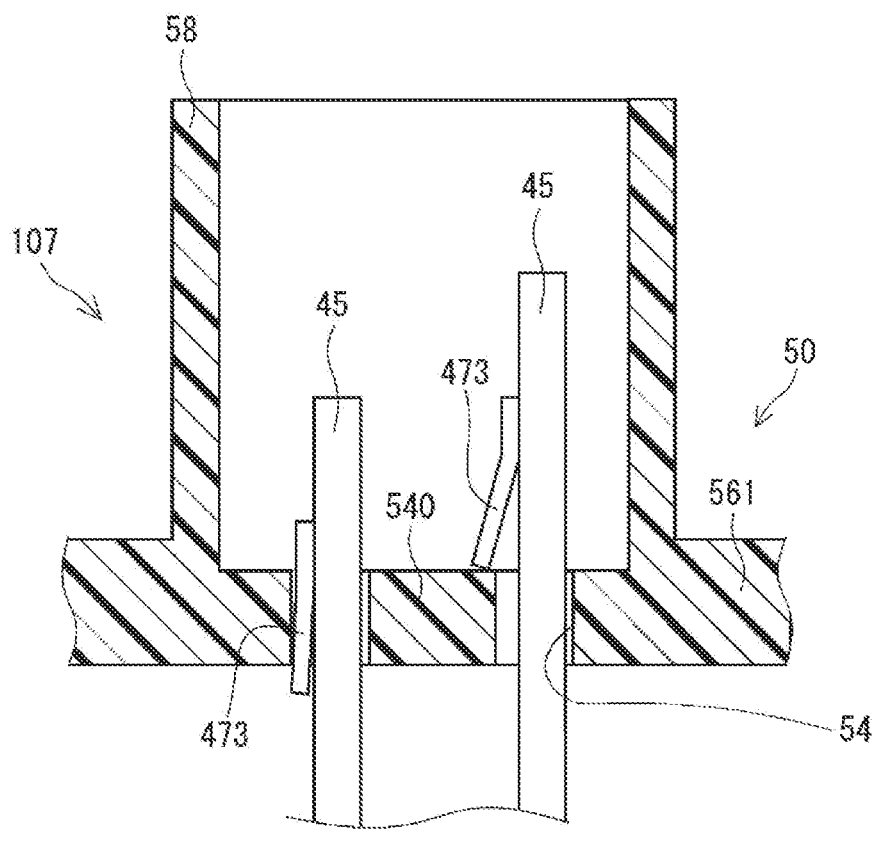
FIG. 26 is an enlarged schematic cross-sectional view of a connector bottom portion according to an embodiment example 3 of the seventh embodiment.

In the seventh embodiment, at least one of each connector terminal 45 and the corresponding terminal insertion hole 54 is resiliently deformed, so that each connector terminal 45 is fitted to the corresponding terminal insertion hole 54 with a low load by means of press-fitting. FIGS. 24 to 26 respectively show three specific examples (three patterns) for two of the connector terminals 45 at the cross-section of the connector 58. In each of FIGS. 24 to 26, the left connector terminal 45 is in the middle of inserting the left connector terminal 45 into the corresponding terminal insertion hole 54, and the right connector terminal 45 is in a state after the right connector terminal 45 is inserted through the corresponding terminal insertion hole 54.

In the embodiment example 1 shown in FIG. 24, one axial location of each connector terminal 45 has a large diameter portion 471, which has an outer diameter that is larger than an outer diameter of adjacent portions of the connector terminal 45 that are located on one side and the other side of large diameter portion 471 and are adjacent to the large diameter portion 471. Each terminal insertion hole 54 has a flexible portion 541 which has an inner diameter slightly smaller than the outer diameter of the large diameter portion 471 of the corresponding connector terminal 45 in its natural state, and the inner diameter of this flexible portion 541 can be expanded by resilient deformation of the flexible portion 541. When the large diameter portion 471 of the connector terminal 45 comes in contact with the flexible portion 541 from the end circuit board 33 side, the flexible portion 541 is expanded by a push-in load applied from the large diameter portion 471, and thereby, the large diameter portion 471 passes through the flexible portion 541.

In the embodiment example 2 shown in FIG. 25, an inner wall of each terminal insertion hole 54 has a plurality of anchoring projections 542 which radially inwardly project from the inner wall of the terminal insertion hole 54. For example, the anchoring projections 542 include a plurality of upper anchoring projections 542 and a plurality of lower anchoring projections 542 which are axially displaced, and circumferential locations of the upper anchoring projections 542 and circumferential locations of the lower anchoring projections 542 are alternately staggered in the circumferential direction. An outer wall of each connector terminal 45 has a plurality of anchoring recesses 472 which correspond to the anchoring projections 542, respectively. When the connector terminal 45 is inserted into the terminal insertion hole 54 from the end circuit board 33 side, the anchoring projections 542 are compressed by resilient deformation. When the connector terminal 45 is inserted to a position, at which the anchoring recesses 472 are opposed to the anchoring projections 542, respectively, the anchoring projections 542 are fitted into the anchoring recesses 472, respectively.

In the embodiment example 3 shown in FIG. 26, a claw 473 is formed at the outer wall of each connector terminal 45. The claw 473 radially outwardly expands from the other end portion of the connector terminal 45, which is an exposing-side end portion of the connector terminal 45 to be exposed in the corresponding mating bore, toward the one end portion of the connector terminal 45 which faces the end circuit board 33. The claw 473 can be resiliently deformed toward the radially inner side to extend along the axis of the connector terminal 45 when the claw 473 is radially inwardly pushed. When the connector terminal 45 is inserted into the terminal insertion hole 54 from the end circuit board 33 side, the connector terminal 45 passes through the terminal insertion hole 54 in the state where the claw 473 is radially inwardly pushed by the inner wall of the terminal insertion hole 54. After the insertion, a distal end portion of the claw 473 contacts the bottom plate portion 540 in the axial direction.

In the seventh embodiment, as described above, at least one of each connector terminal 45 and the corresponding terminal insertion hole 54 is resiliently deformed to form a press-fit connection at the third process of the assembling. The load at the time of resilient deformation is made smaller than the load generated in the first process and the load generated in the second process, so that the controller unit 107 having the two-board structure can be appropriately assembled.

Eighth Embodiment

Figure 27A:
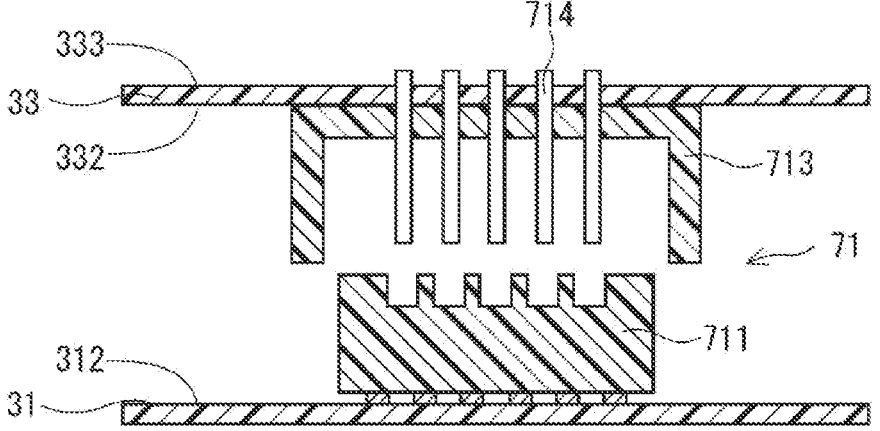
FIG. 27A is a schematic cross-sectional view of a controller unit of an eighth embodiment in which a board-to-board connector serving as an inter-board connector is used.
Figure 27B:
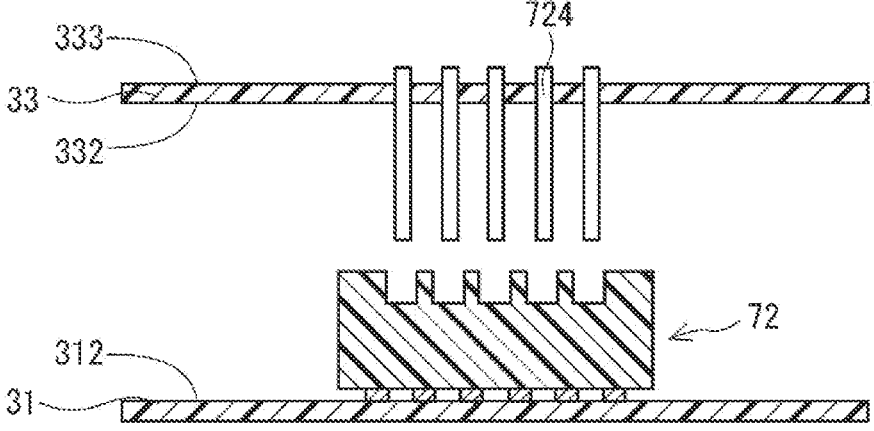
FIG. 27B is a schematic cross-sectional view of a controller unit of the eighth embodiment in which a socket connector serving as an inter-board connector is used.

The eighth embodiment will be described with reference to FIGS. 27A, 27B and 28. In the eighth embodiment, in place of the inter-board terminals 43, the inter-board connectors are used as the structure for electrically connecting between the generic circuit board 31 and the end circuit board 33. FIGS. 27A and 27B show a state before the time of connecting where components of each inter-board connector, which are respectively installed to the circuit boards 31, 33, are separated from each other.

In the example shown in FIG. 27A, a plurality of commercially available board-to-board (BtoB) connectors 71 are used. A lower component 711 of each board-to-board connector 71 is surface mounted at an upper surface 312 of the generic circuit board 31, and an upper component 713 of the board-to-board connector 71 is installed to a lower surface 332 of the end circuit board 33. A plurality of pins 714 of the upper component 713 are electrically connected to an electrical pattern (not shown) of the upper surface 333 through insertion of the pins 714 into holes of the end circuit board 33.

In the example shown in FIG. 27B, a plurality of commercially available socket connectors 72 are used. Each socket connector 72 is surface mounted at the upper surface 312 of the generic circuit board 31. A plurality of pins 724 of a pin header type, which are electrically connected to the electrical pattern (not shown) of the upper surface 333 by inserting the pins 724 into the holes of the end circuit board 33, are respectively connected to corresponding terminals of the socket connector 72.

Figure 28:
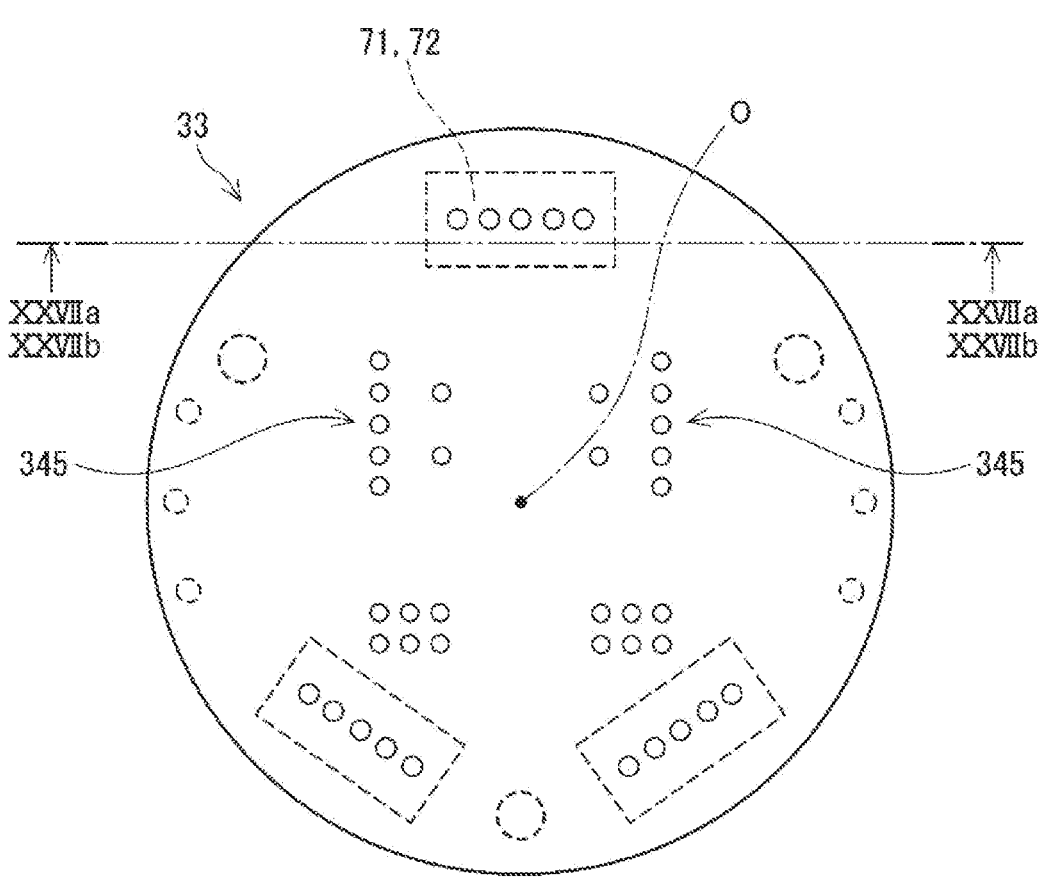
FIG. 28 is a plan view of an end circuit board showing installation locations of the inter-board connectors according to the eighth embodiment.

As shown in FIG. 28, in the view taken in the axial direction of the electric motor 80, the board-to-board connectors 71 or the socket connectors 72 are placed on the radially outer side of the connector terminals 45 like the inter-board terminals 43 of, for example, the first embodiment. The type and the number of inter-board connectors 71, 72 are selected based on, for example, the number of available pins, a rating or the like.

An assembling method of the controller unit using the inter-board connectors 71, 72 should be interpreted such that the inter-board terminals 43 used in the assembling method of the first embodiment described above with reference to FIGS. 13 and 14 serve as portions of the inter-board connectors. For example, with respect to the structure of FIG. 27A, the generic circuit board 31, to which the lower component 711 (serving as the portion of the inter-board connector 71) is joined, is defined as the generic circuit board assembly 310. Furthermore, the end circuit board 33, to which the one end portion of each of the connector terminals 45 and the upper component 713 (serving as the portion of the inter-board connector 71) are connected, is defined as the end circuit board assembly 330. Even with the manufacturing method of the drive device with this structure can achieve the advantages that are similar to those of the first embodiment.

Other Embodiments (a) The number of the generic circuit board(s) is not limited to one but may be at least two (two or more), and each of the at least two generic circuit boards may be stacked at a corresponding one of a plurality of stacking levels to form a stack of circuit boards. A plurality of inter-board terminals 43 are connected between the generic circuit boards. For example, now, it is assumed to provide a controller unit having a four-board structure (i.e., a structure having four circuit boards), which includes three generic circuit boards and one end circuit board.

Among the three generic circuit boards, a first generic circuit board (i.e., a generic circuit board that is closest to the motor frame 840), to which one end portion of each corresponding one of the plurality of inter-board terminals 43 or a portion of the inter-board connector(s) is joined, is defined as a first generic circuit board assembly. Among the three generic circuit boards, a second generic circuit board, to which one end portion of each corresponding one of the plurality of inter-board terminals 43 or a portion of the corresponding inter-board connector(s) is joined, is defined as a second generic circuit board assembly. Among the three generic circuit boards, a third generic circuit board (i.e., a generic circuit board placed between the second generic circuit board and the end circuit board), to which one end portion of each corresponding one of the plurality of inter-board terminals 43 or a portion of the corresponding inter-board connector(s) is joined, is defined as a third generic circuit board assembly. The first generic circuit board assembly serves as a lowest generic circuit board assembly which is closest to the motor frame. The third generic circuit board assembly serves as a highest generic circuit board assembly which is placed immediately below the end circuit board.

In the first process, the operator assembles the first generic circuit board assembly to the motor frame 840. Then, the operator assembles the second generic circuit board assembly (serving as a next generic circuit board assembly placed in a next one of the stacking levels that is immediately above the first generic circuit board assembly) to the first generic circuit board assembly (serving as a latest assembled generic circuit board assembly). Next, the operator assembles the third generic circuit board assembly to the second generic circuit board assembly and may repeat the similar operation for the rest of the generic circuit board assemblies (if there are more than the three generic circuit boards). In this way, the operator sequentially assembles the first to the third generic circuit board assemblies while the third generic circuit board assembly serves as a top generic circuit board assembly. The second process and the third process are similar to the second process and the third process for the two-board structure indicated in FIG. 11.

In the above-described four-board structure, for example, the second generic circuit board assembly and the third generic circuit board assembly may be assembled in advance at a sub-assembling process, and then, a generic circuit board assembly, which is assembled in the sub-assembling process and includes the two generic circuit board assemblies described above, may be assembled to the first generic circuit board assembly at once in a main assembling process. Such an applied assembling procedure (modified assembling procedure) is also interpreted to be included in the technical scope of the present disclosure.

(b) It is only required that the number of the connector(s) formed at the top plate portion 561 of the connector housing 50 is at least one. The number of the connector(s) and the application of each connector terminal are not limited to the examples in the above embodiments but may be set as needed to meet needs.

(c) The present disclosure is not limited to the examples indicated in the first to sixth embodiments, and any other suitable structure may be adopted as a specific structure in which the connector terminal binder(s) 65 covers the bottom hole(s) 55 of the connector(s) 57, 58 from the end circuit board 33 side, or is fitted to the bottom hole(s) 55 of the connector(s) 57, 58. Furthermore, the present disclosure is not limited to the example shown in the seventh embodiment, any other suitable structures may be adopted as a specific structure, in which each connector terminal 45 or the corresponding terminal insertion hole 54 is resiliently deformed to form the press-fit connection.

(d) The drive device 800 of the present disclosure is not limited to the steering assist motor of the electric power steering system. The drive device 800 of the present disclosure may be used as a reaction motor or a steering motor in a steer-by-wire system, or an electric motor of any other type of drive device.

As described above, the present disclosure is not limited to the embodiments described above and can be implemented in various forms without departing from the spirit of the present disclosure.

The present disclosure has been described with reference to the embodiments. However, the present disclosure is not limited to the above embodiments and the structures described therein. The present disclosure also includes various variations and variations within the equivalent range. Also, various combinations and forms, as well as other combinations and forms that include only one element, more, or less, are within the scope and ideology of the present disclosure.

What is claimed is:

1. A method for manufacturing a drive device that includes:

an electric motor which includes a stator and a rotor;

a controller unit which is placed on one side of the electric motor in an axial direction of the electric motor and is configured to control a drive operation of the electric motor, wherein the electric motor and the controller unit are integrally formed together;

a motor frame that is made of metal and is installed to an end portion of the electric motor which faces the controller unit in the axial direction of the electric motor;

at least two circuit boards, each of which holds at least one electronic component of the controller unit and is stacked at a corresponding one of a plurality of stacking levels on an opposite side of the motor frame which is opposite to the electric motor, wherein the at least two circuit boards include:

an end circuit board which is farthest from the motor frame among the at least two circuit boards; and at least one generic circuit board which is other than the end circuit board;

a connector housing that is made of resin and is shaped in a bottomed tubular form and thereby has:

a top plate portion which is opposed to the end circuit board; and an outer tubular portion which extends from an outer periphery of the top plate portion toward the electric motor and has an end portion fixed to one of the electric motor and the motor frame, wherein the connector housing has at least one connector, and the at least one connector is formed at the top plate portion and has a mating bore which opens toward a side opposite to the end circuit board;

a plurality of inter-board terminals or an inter-board connector, wherein:

the inter-board connector has first mating portion and a second mating portion which are formed separately from each other and are configured to mate with each other;

the at least one generic circuit board is only one generic circuit board or at least two generic circuit boards;

in one case where the at least one generic circuit board is the only one generic circuit board, the inter-board connector or each corresponding one of the plurality of inter-board terminals is joined between the only one generic circuit board and the end circuit board; and in another case where the at least one generic circuit board is the at least two generic circuit boards, the inter-board connector or each corresponding one of the plurality of inter-board terminals is joined between corresponding two of the at least two generic circuit boards;

a plurality of connector terminals, wherein:

the at least one connector is one or at least two connectors;

each of the at least one connector is provided with a corresponding connector terminal group, which includes at least two connector terminals among the plurality of connector terminals and is configured such that one end portion of each connector terminal included in the corresponding connector terminal group is joined to the end circuit board, and another end portion of each connector terminal included in the corresponding connector terminal group is exposed in the mating bore of a corresponding one of the at least one connector; and at least one connector terminal binder which is made of resin and includes one or at least two connector terminal binders, wherein:

each of the at least one connector terminal binder is provided to a corresponding one of the at least one connector to hold an intermediate portion of each connector terminal included in the corresponding connector terminal group of the corresponding one of the at least one connector and thereby bundle the corresponding connector terminal group of the corresponding one of the at least one connector, or each of the at least one connector terminal binder is provided to adjacent two or more of the at least two connectors to hold the intermediate portion of each connector terminal included in the corresponding connector terminal group of each of the adjacent two or more of the at least two connectors and thereby bundle the corresponding connector terminal group of each of the adjacent two or more of the at least two connectors;

the at least one generic circuit board, to which an end portion of each corresponding one of the plurality of inter-board terminals or one of the first mating portion and the second mating portion of the inter-board connector is joined, is defined as at least one generic circuit board assembly, wherein in the one case where the at least one generic circuit board is the only one generic circuit board, the at least one generic circuit board assembly is only one generic circuit board assembly, and in the another case where the at least one generic circuit board is the at least two generic circuit boards, the at least one generic circuit board assembly is at least two generic circuit board assemblies; and the end circuit board, to which the one end portion of each of the plurality of connector terminals bound by the at least one connector terminal binder is joined, or additionally another one of the first mating portion and the second mating portion of the inter-board connector, which is different from the one of the first mating portion and the second mating portion of the inter-board connector of the at least one generic circuit board assembly, is joined besides the one end portion of each of the plurality of connector terminals bound by the at least one connector terminal binder, is defined as an end circuit board assembly, the method comprising:

a first process of assembling the at least one generic circuit board assembly to the motor frame, wherein:

in the one case where the at least one generic circuit board assembly is the only one generic circuit board assembly, which is placed at a lowest one of the plurality of stacking levels, the only one generic circuit board assembly is assembled to the motor frame; and in the another case where the at least one generic circuit board assembly is the at least two generic circuit board assemblies, a lowest one of the at least two generic circuit board assemblies, which is placed at the lowest one of the plurality of stacking levels, is assembled to the motor frame, and a rest of the at least two generic circuit board assemblies is sequentially assembled to the lowest one of the at least two generic circuit board assemblies until a highest one of the at least two generic circuit board assemblies, which is placed immediately below the end circuit board, is assembled;

a second process of assembling the end circuit board assembly to the at least one generic circuit board assembly after the first process and thereby electrically connecting the end circuit board assembly to the at least one generic circuit board assembly through the inter-board connector or each corresponding one of the plurality of inter-board terminals, wherein:

in the one case where the at least one generic circuit board assembly is the only one generic circuit board assembly, the end circuit board assembly is assembled to the only one generic circuit board assembly; and in the another case where the at least one generic circuit board assembly is the at least two generic circuit board assemblies, the end circuit board assembly is assembled to the highest one of the at least two generic circuit board assemblies; and a third process of exposing the another end portion of each of the plurality of connector terminals of the end circuit board assembly in the mating bore of the corresponding one of the at least one connector and placing the connector housing to cover the end circuit board assembly and the at least one generic circuit board assembly with the connector housing and fixing the outer tubular portion to the one of the electric motor and the motor frame after the second process, wherein:

the third process is carried out such that a load, which is generated when the another end portion of each of the plurality of connector terminals is exposed in the mating bore of the corresponding one of the at least one connector in the third process, is smaller than a load, which is generated in the first process, and a load, which is generated in the second process.

2. The method for manufacturing the drive device according to claim 1, wherein:

a bottom of the mating bore of each of the at least one connector has a bottom hole, through which each connector terminal included in the corresponding connector terminal group held by a corresponding one of the at least one connector terminal binder is insertable;

the end circuit board assembly has a hook engaging portion which is provided to a corresponding one of the at least one connector terminal binder or a corresponding one of the plurality of connector terminals and is configured to engage with a hook jig that has a distal end portion shaped in a hook form; and the third process includes engaging the hook jig to the hook engaging portion at an inside of the bottom hole of a corresponding one of the at least one connector, and lifting the end circuit board assembly toward the connector housing with the hook jig.

3. A drive device comprising:

an electric motor which includes a stator and a rotor;

a controller unit which is placed on one side of the electric motor in an axial direction of the electric motor and is configured to control a drive operation of the electric motor, wherein the electric motor and the controller unit are integrally formed together;

a motor frame that is made of metal and is installed to an end portion of the electric motor which faces the controller unit in the axial direction of the electric motor;

at least two circuit boards, each of which holds at least one electronic component of the controller unit and is stacked at a corresponding one of a plurality of stacking levels on an opposite side of the motor frame which is opposite to the electric motor, wherein the at least two circuit boards include:

an end circuit board which is farthest from the motor frame among the at least two circuit boards; and at least one generic circuit board which is other than the end circuit board;

a connector housing that is made of resin and is shaped in a bottomed tubular form and thereby has:

a top plate portion which is opposed to the end circuit board; and an outer tubular portion which extends from an outer periphery of the top plate portion toward the electric motor and has an end portion fixed to one of the electric motor and the motor frame, wherein the connector housing has at least one connector, and the at least one connector is formed at the top plate portion and has a mating bore which opens toward a side opposite to the end circuit board while a bottom hole opens at a bottom of the mating bore;

a plurality of inter-board terminals or an inter-board connector, wherein:

the at least one generic circuit board is only one generic circuit board or at least two generic circuit boards;

in one case where the at least one generic circuit board is the only one generic circuit board, the inter-board connector or each corresponding one of the plurality of inter-board terminals is joined between the only one generic circuit board and the end circuit board; and in another case where the at least one generic circuit board is the at least two generic circuit boards, the inter-board connector or each corresponding one of the plurality of inter-board terminals is joined between corresponding two of the at least two generic circuit boards;

a plurality of connector terminals, wherein:

the at least one connector is one or at least two connectors;

each of the at least one connector is provided with a corresponding connector terminal group, which includes at least two connector terminals among the plurality of connector terminals and is configured such that one end portion of each connector terminal included in the corresponding connector terminal group is joined to the end circuit board, and another end portion of each connector terminal included in the corresponding connector terminal group is exposed in the mating bore of a corresponding one of the at least one connector; and at least one connector terminal binder which is made of resin and includes one or at least two connector terminal binders, wherein:

each of the at least one connector terminal binder is provided to a corresponding one of the at least one connector to hold an intermediate portion of each connector terminal included in the corresponding connector terminal group of the corresponding one of the at least one connector and thereby bundle the corresponding connector terminal group of the corresponding one of the at least one connector, or each of the at least one connector terminal binder is provided to adjacent two or more of the at least two connectors to hold the intermediate portion of each connector terminal included in the corresponding connector terminal group of each of the adjacent two or more of the at least two connectors and thereby bundle the corresponding connector terminal group of each of the adjacent two or more of the at least two connectors;

each of the at least one connector terminal binder covers the bottom hole of the corresponding one of the at least one connector or the bottom holes of the adjacent two or more of the at least two connectors from a side at which the end circuit board is placed, or each of the at least one connector terminal binder is fitted to the bottom hole of the corresponding one of the at least one connector or the bottom holes of the adjacent two or more of the at least two connectors; and an inner surface of the top plate portion of the connector housing is recessed away from the end circuit board and thereby forms a recess around the bottom hole, and an outer periphery of the connector terminal binder faces a bottom surface of the recess in the axial direction of the electric motor.

4. The drive device according to claim 3, wherein each of the at least one connector terminal binder is resiliently deformed and is fitted to the bottom hole of the corresponding one of the at least one connector.

5. The drive device according to claim 3, wherein in a view taken in the axial direction of the electric motor, the inter-board connector or each of the plurality of inter-board terminals is placed on a radially outer side of the plurality of connector terminals.

6. A drive device comprising:

an electric motor which includes a stator and a rotor;

a controller unit which is placed on one side of the electric motor in an axial direction of the electric motor and is configured to control a drive operation of the electric motor, wherein the electric motor and the controller unit are integrally formed together;

a motor frame that is made of metal and is installed to an end portion of the electric motor which faces the controller unit in the axial direction of the electric motor;

at least two circuit boards, each of which holds at least one electronic component of the controller unit and is stacked at a corresponding one of a plurality of stacking levels on an opposite side of the motor frame which is opposite to the electric motor, wherein the at least two circuit boards include:

an end circuit board which is farthest from the motor frame among the at least two circuit boards; and at least one generic circuit board which is other than the end circuit board;

a connector housing that is made of resin and is shaped in a bottomed tubular form and thereby has:

a top plate portion which is opposed to the end circuit board; and an outer tubular portion which extends from an outer periphery of the top plate portion toward the electric motor and has an end portion fixed to one of the electric motor and the motor frame, wherein the connector housing has at least one connector, and the at least one connector is formed at the top plate portion and has a mating bore which opens toward a side opposite to the end circuit board;

a plurality of inter-board terminals or an inter-board connector, wherein:

the at least one generic circuit board is only one generic circuit board or at least two generic circuit boards;

in one case where the at least one generic circuit board is the only one generic circuit board, the inter-board connector or each corresponding one of the plurality of inter-board terminals is joined between the only one generic circuit board and the end circuit board; and in another case where the at least one generic circuit board is the at least two generic circuit boards, the inter-board connector or each corresponding one of the plurality of inter-board terminals is joined between corresponding two of the at least two generic circuit boards;

a plurality of connector terminals, wherein:

the at least one connector is one or at least two connectors;

each of the at least one connector is provided with a corresponding connector terminal group, which includes at least two connector terminals among the plurality of connector terminals and is configured such that one end portion of each connector terminal included in the corresponding connector terminal group is joined to the end circuit board, and another end portion of each connector terminal included in the corresponding connector terminal group is inserted through a corresponding one of a plurality of terminal insertion holes formed at a bottom of the mating bore of a corresponding one of the at least one connector and is exposed in the mating bore of the corresponding one of the at least one connector; and at least one connector terminal binder which is made of resin and includes one or at least two connector terminal binders, wherein:

each of the at least one connector terminal binder is provided to a corresponding one of the at least one connector to hold an intermediate portion of each connector terminal included in the corresponding connector terminal group of the corresponding one of the at least one connector and thereby bundle the corresponding connector terminal group of the corresponding one of the at least one connector, or each of the at least one connector terminal binder is provided to adjacent two or more of the at least two connectors to hold the intermediate portion of each connector terminal included in the corresponding connector terminal group of each of the adjacent two or more of the at least two connectors and thereby bundle the corresponding connector terminal group of each of the adjacent two or more of the at least two connectors; and each of the plurality of connector terminals is fitted to the corresponding one of the plurality of terminal insertion holes formed at the bottom of the mating bore of the corresponding one of the at least one connector through resilient deformation of at least one of: each of the plurality of connector terminals; and the corresponding one of the plurality of terminal insertion holes formed at the bottom of the mating bore of the corresponding one of the at least one connector, wherein the at least one of each connector terminal and the corresponding one of the plurality of terminal insertion holes is configured to resiliently deform when each connector terminal is inserted into the corresponding one of the plurality of terminal insertion holes in the axial direction of the electric motor.

7. The drive device according to claim 6, wherein in a view taken in the axial direction of the electric motor, the inter-board connector or each of the plurality of inter-board terminals is placed on a radially outer side of the plurality of connector terminals.

* * * * *